(12) United States Patent
Zhu et al.

(10) Patent No.: US 11,917,197 B2
(45) Date of Patent: Feb. 27, 2024

(54) EXTENSIONS OF INTRA CODING MODES IN VIDEO CODING

(71) Applicants: Beijing Bytedance Network Technology Co., Ltd., Beijing (CN); Bytedance Inc., Los Angeles, CA (US)

(72) Inventors: Weijia Zhu, San Diego, CA (US); Li Zhang, San Diego, CA (US); Jizheng Xu, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 181 days.

(21) Appl. No.: 17/680,979

(22) Filed: Feb. 25, 2022

(65) Prior Publication Data
US 2022/0182669 A1    Jun. 9, 2022

Related U.S. Application Data

(63) Continuation of application No. PCT/CN2020/111467, filed on Aug. 26, 2020.

(30) Foreign Application Priority Data

Aug. 26, 2019   (WO) ............... PCT/CN2019/102586

(51) Int. Cl.
*H04N 19/593*   (2014.01)
*H04N 19/11*    (2014.01)
(Continued)

(52) U.S. Cl.
CPC .......... *H04N 19/593* (2014.11); *H04N 19/11* (2014.11); *H04N 19/124* (2014.11); *H04N 19/157* (2014.11); *H04N 19/176* (2014.11)

(58) Field of Classification Search
CPC .... H04N 19/593; H04N 19/11; H04N 19/124; H04N 19/157; H04N 19/176
(Continued)

(56) References Cited

U.S. PATENT DOCUMENTS 8,275,051 B2   9/2012   Hannuksela et al.
9,369,708 B2   6/2016   Zhang et al.
(Continued)

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

(Continued)

*Primary Examiner* — Matthew David Kim
(74) *Attorney, Agent, or Firm* — Perkins Coie LLP

(57) ABSTRACT

Extensions of intra coding modes in video coding are described. One example is a method for video processing, comprising: generating, for a conversion between a current video block of a video and a bitstream representation of a video, a set of extended intra prediction modes (IPMs) associated with the current video block by revising a set of existing IPMs to include at least one new coding method, wherein the new coding method is different from coding methods in the existing IPMs and is to be treated as IPM; and performing the conversion based on the set of extended IPMs.

19 Claims, 28 Drawing Sheets

(51) Int. Cl.
*H04N 19/124* (2014.01)
*H04N 19/157* (2014.01)
*H04N 19/176* (2014.01)

(58) Field of Classification Search
USPC .................................................. 375/240.12
See application file for complete search history.

(56) References Cited

U.S. PATENT DOCUMENTS

| | | | |
|---|---|---|---|
| 9,516,306 | B2 | 12/2016 | Zhang et al. |
| 9,525,861 | B2 | 12/2016 | Zhang et al. |
| 9,615,090 | B2 | 4/2017 | Zhang et al. |
| 2013/0044811 | A1* | 2/2013 | Kim ........................ H04N 19/14 375/E7.243 |
| 2015/0110181 | A1* | 4/2015 | Saxena ................ H04N 19/147 375/240.12 |
| 2015/0326880 | A1 | 11/2015 | He et al. |
| 2016/0227211 | A1* | 8/2016 | Gisquet .................. H04N 19/11 |
| 2016/0227217 | A1 | 8/2016 | Karczewicz et al. |
| 2016/0360224 | A1* | 12/2016 | Laroche ............... H04N 19/176 |
| 2017/0280143 | A1* | 9/2017 | Xu ........................ H04N 19/503 |
| 2017/0302935 | A1* | 10/2017 | Li ........................ H04N 19/593 |
| 2018/0014017 | A1 | 1/2018 | Li et al. |
| 2018/0205946 | A1 | 7/2018 | Zhang et al. |
| 2019/0158828 | A1* | 5/2019 | Chang .................... H04N 19/11 |
| 2019/0166370 | A1 | 5/2019 | Xiu et al. |
| 2020/0092550 | A1* | 3/2020 | Piao ........................ H04N 19/80 |
| 2020/0296417 | A1* | 9/2020 | Ko ........................ H04N 19/105 |
| 2021/0021832 | A1* | 1/2021 | Lee ........................ H04N 19/132 |
| 2021/0243430 | A1* | 8/2021 | Galpin ................ H04N 19/105 |
| 2021/0274215 | A1* | 9/2021 | Kang ..................... H04N 19/96 |
| 2021/0329287 | A1* | 10/2021 | Chiang ................ H04N 19/513 |

OTHER PUBLICATIONS

"Information Technology—High Efficiency Coding and Media Delivery in Heterogeneous Environments—Part 2: High Efficiency Video Coding" Apr. 20, 2018, ISO/DIS 23008, 4th Edition.

Pfaff et al. "CE3-Related: Improved Intra Mode Coding Based on Unified MPM List Generation," Joint Video Experts Team (JVET) of ITU-T SG 16 WP 3 and ISO/IEC JTC 1/SC 29/WG 11 15th Meeting: Gothenburg, SWE, Jul. 3-12, 2019, document JVETO0484, 2019.

Pham Van et al. "Non-CE8: Intra Prediction Mode Derivation for DM Chroma Block with Corresponding IBC/PCM Luma," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0651, 2019.

Said et al. "CE5: Per-Context CABAC Initialization with Single Window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0413, 2019.

Wang et al. "CE3-related: A Unified MPM List for Intra Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0185, 2019.

Zhu et al. "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0258, 2019.

https://vcgit.hhi.fraunhofer.de/jvet/VVCSoftware_VTM/tags/VTM-6.0.

International Search Report and Written Opinion from PCT/CN2020/111467 dated Dec. 2, 2020 (10 pages).

* cited by examiner

EXTENSIONS OF INTRA CODING MODES IN VIDEO CODING

CROSS-REFERENCE TO RELATED APPLICATION

This application is a continuation application of International Application No. PCT/CN2020/111467 filed on Aug. 26, 2020, which timely claims the priority to and benefits of International Patent Application No. PCT/CN2019/102586, filed on Aug. 26, 2019. The entire disclosures of International Patent Applications PCT/CN2020/111467 and No. PCT/CN2019/102586 are incorporated by reference as part of the disclosure of this application.

TECHNICAL FIELD

This patent document relates to video coding techniques, decoding techniques, devices, and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This document discloses methods, systems, and devices related to the use of affine motion compensation in video coding and decoding.

In one representative aspect, a video processing method is disclosed. The method includes performing a conversion between a current video block and a coded representation of the current video block, wherein, during the conversion, at least one coded prediction method is treated as an intra prediction mode (IPM) in a set of IPMs without a use of a flag to signal the at least one coded prediction mode.

In yet another aspect, another video processing method is disclosed. The method includes performing a conversion between a current video block and a coded representation of the current video block, wherein, during the conversion, at least one coded prediction method is treated as an intra prediction mode (IPM) in a list of most probable modes (MPMs) without a use of a flag to signal the at least one coded prediction mode.

In yet another aspect, another video processing method is disclosed. The method includes performing a conversion between a current video block and a coded representation of the current video block, wherein, during the conversion, in a palette mode, a context for a syntax element associated with the current video block is derived from a neighboring block used in deriving a list of MPMs; and aligning a position of the neighboring block with a position of the current video block.

In yet another aspect, another video processing method is disclosed. The method includes generating, for a conversion between a current video block of a video and a bitstream representation of a video, a set of extended intra prediction modes (IPMs) associated with the current video block by revising a set of existing IPMs to include at least one new coding method, wherein the new coding method is different from coding methods in the existing IPMs and is to be treated as IPM; and performing the conversion based on the set of extended IPMs.

In yet another aspect, another video processing method is disclosed. The method includes generating, for a conversion between a current video block of a video and a bitstream representation of the video, a revised most probable intra mode (MPM) list associated with the current video block, wherein the revised MPM list includes at least one new coding method which is different from existing intra prediction modes (IPMs) in a set of existing IPMs and is to be treated as IPM; and performing the conversion based on the revised MPM list.

In yet another aspect, another video processing method is disclosed. The method includes determining, for a conversion between a chroma block of a video and a bitstream representation of the chroma block, whether the chroma block is a screen content block; in response to the determination indicating the chroma block is a screen content block, modifying intra prediction process and/or transform process of the chroma block; and performing the conversion based on the modified intra prediction process and/or transform process.

In yet another aspect, another video processing method is disclosed. The method includes performing a conversion between a current video block of a video and a bitstream representation of the video, wherein during the conversion, positions of left neighboring block and/or above neighboring block employed in context derivation for one or more syntax elements are aligned with positions of neighboring left block and/or above neighboring block used in most probable intra mode (MPM) derivation.

In yet another aspect, another video processing method is disclosed. The method includes signaling, for a conversion between a current video block of a video and a bitstream representation of the video, indication of usage of palette modes using multiple contexts; performing the conversion based on the indication.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

DETAILED DESCRIPTION

The present document provides several techniques that can be embodied into digital video encoders and decoders. Section headings are used in the present document for clarity of understanding and do not limit scope of the techniques and embodiments disclosed in each section only to that section.

1. Summary

The disclosed technology is related to video coding technologies.

Specifically, it is related to intra mode coding in video coding. It may be applied to the existing video coding standard like HEVC, or the standard (e.g., Versatile Video Coding) to be finalized. It may be also applicable to future video coding standards or video codecs.

2. Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Intra Block Copy

Figure 1:
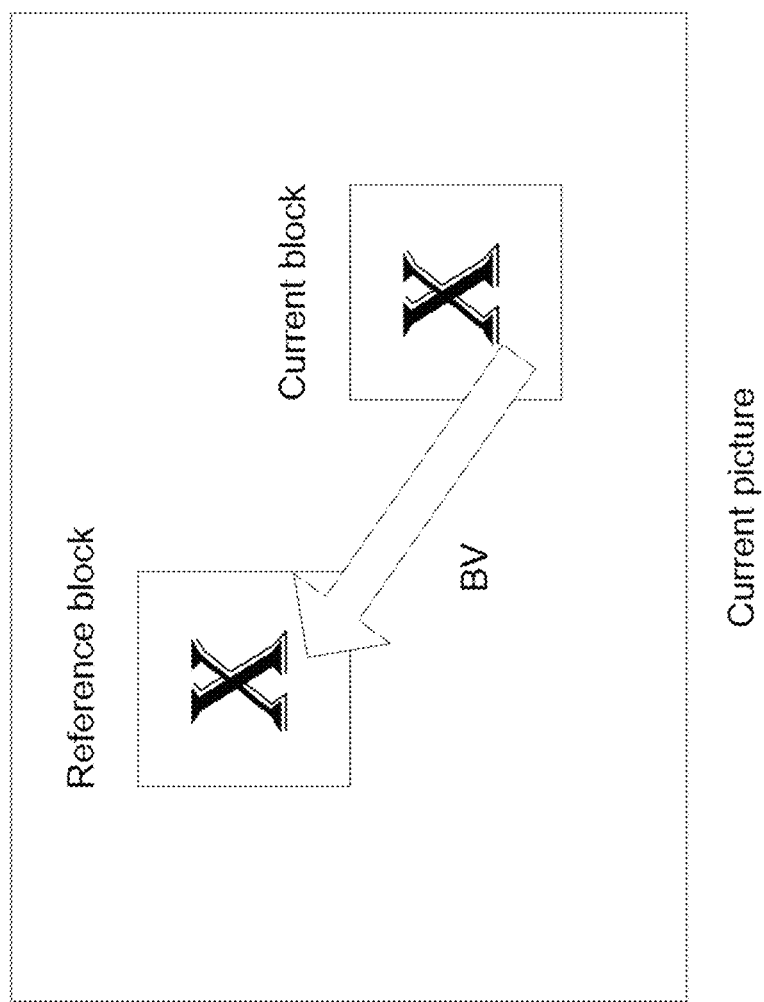
FIG. 1 shows an example of intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX} = (\text{ChromaArrayType}==0)?0:(mvCLX[0]\ \&0x7?2:0) \quad (8\text{-}106)$$

$$\text{offsetY} = (\text{ChromaArrayType}==0)?0:(mvCLX[1]\ \&0x7?2:0) \quad (8\text{-}107)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both the following conditions shall be true:

The value of (mvLX[0]>>2)+nPbW+xB1+offsetX is less than or equal to 0.

The value of (mvLX[1]>>2)+nPbH+yB1+offsetY is less than or equal to 0.

The following condition shall be true:

$$(xPb+(mvLX[0]>>2)+nPbSw-1+\text{offset}X)/CtbSizeY - xCurr/CtbSizeY <= yCurr/CtbSizeY - (yPb+(mvLX[1]>>2)+nPbSh-1+\text{offset}Y)/CtbSizeY \quad (8\text{-}108)$$

Thus, the case that the reference block overlaps with the current block or the reference block is outside of the picture will not happen. There is no need to pad the reference or prediction block.

2.3 IBC in VVC Test Model

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1 IBC Merge Mode

Figure 2:
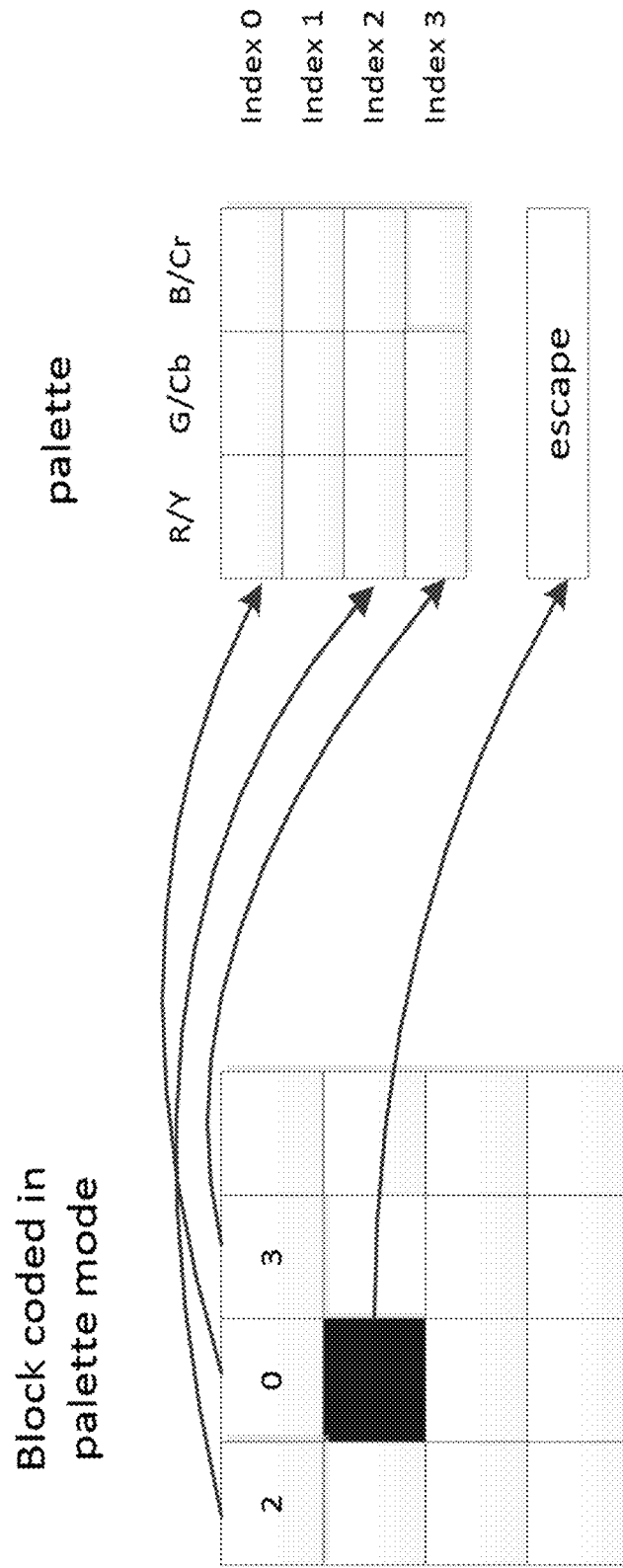
FIG. 2 shows an example of a block coded in palette mode.
Figure 3:
FIG. 3 shows an example of a use of palette predictor to signal palette entries.

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
Check $A_0$, $A_1$ until an available candidate is found.
Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.4 Palette Mode

The basic idea behind a palette mode is that the samples in the CU are represented by a small set of representative colour values. This set is referred to as the palette. It is also possible to indicate a sample that is outside the palette by signalling an escape symbol followed by (possibly quantized) component values. This is illustrated in FIG. 2.

2.5 Palette Mode in HEVC Screen Content Coding Extensions (HEVC-SCC)

In the palette mode in HEVC-SCC, a predictive way is used to code the palette and index map.

2.5.1 Coding of the Palette Entries

For coding of the palette entries, a palette predictor is maintained. The maximum size of the palette as well as the palette predictor is signalled in the SPS. In HEVC-SCC, a palette_predictor_initializer_present_flag is introduced in the PPS. When this flag is 1, entries for initializing the palette predictor are signalled in the bitstream. The palette predictor is initialized at the beginning of each CTU row, each slice and each tile. Depending on the value of the palette_predictor_initializer_present_flag, the palette predictor is reset to 0 or initialized using the palette predictor initializer entries signalled in the PPS. In HEVC-SCC, a palette predictor initializer of size 0 was enabled to allow explicit disabling of the palette predictor initialization at the PPS level.

For each entry in the palette predictor, a reuse flag is signalled to indicate whether it is part of the current palette. This is illustrated in FIG. 3. The reuse flags are sent using run-length coding of zeros. After this, the number of new palette entries are signalled using exponential Golomb code of order 0. Finally, the component values for the new palette entries are signalled.

2.5.2 Coding of Palette Indices

Figure 4:
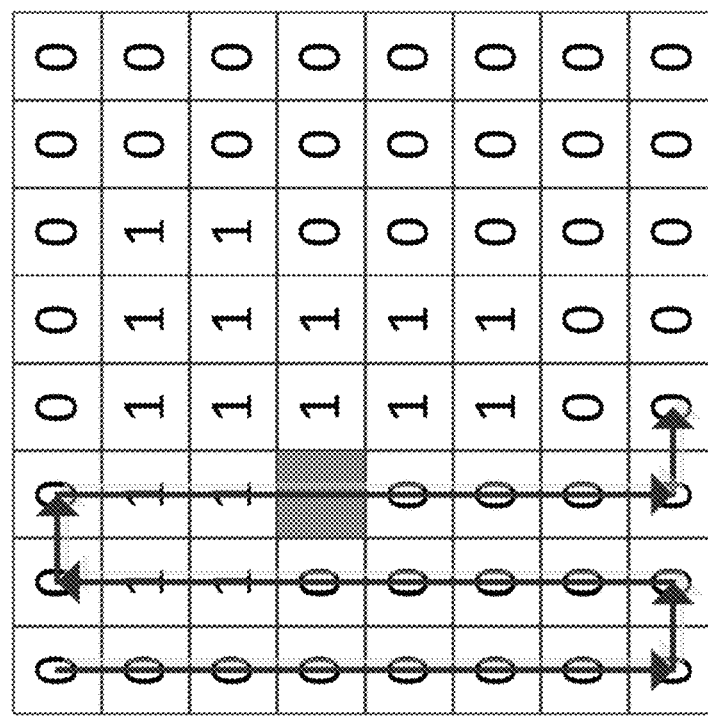
FIG. 4 shows an example of horizontal and vertical traverse scans.
Figure 4:
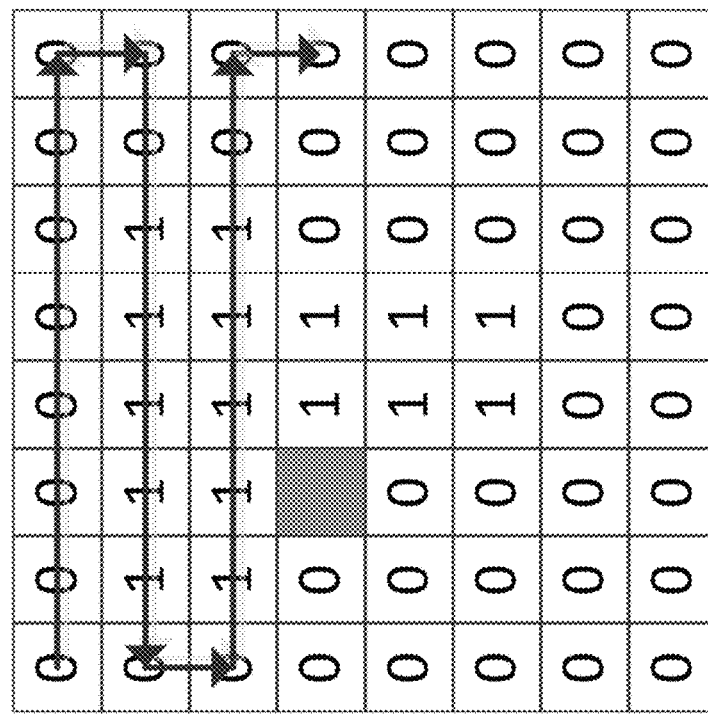

The palette indices are coded using horizontal and vertical traverse scans as shown in FIG. 4. The scan order is explicitly signalled in the bitstream using the palette_transpose_flag. For the rest of the subsection it is assumed that the scan is horizontal.

Figure 5:
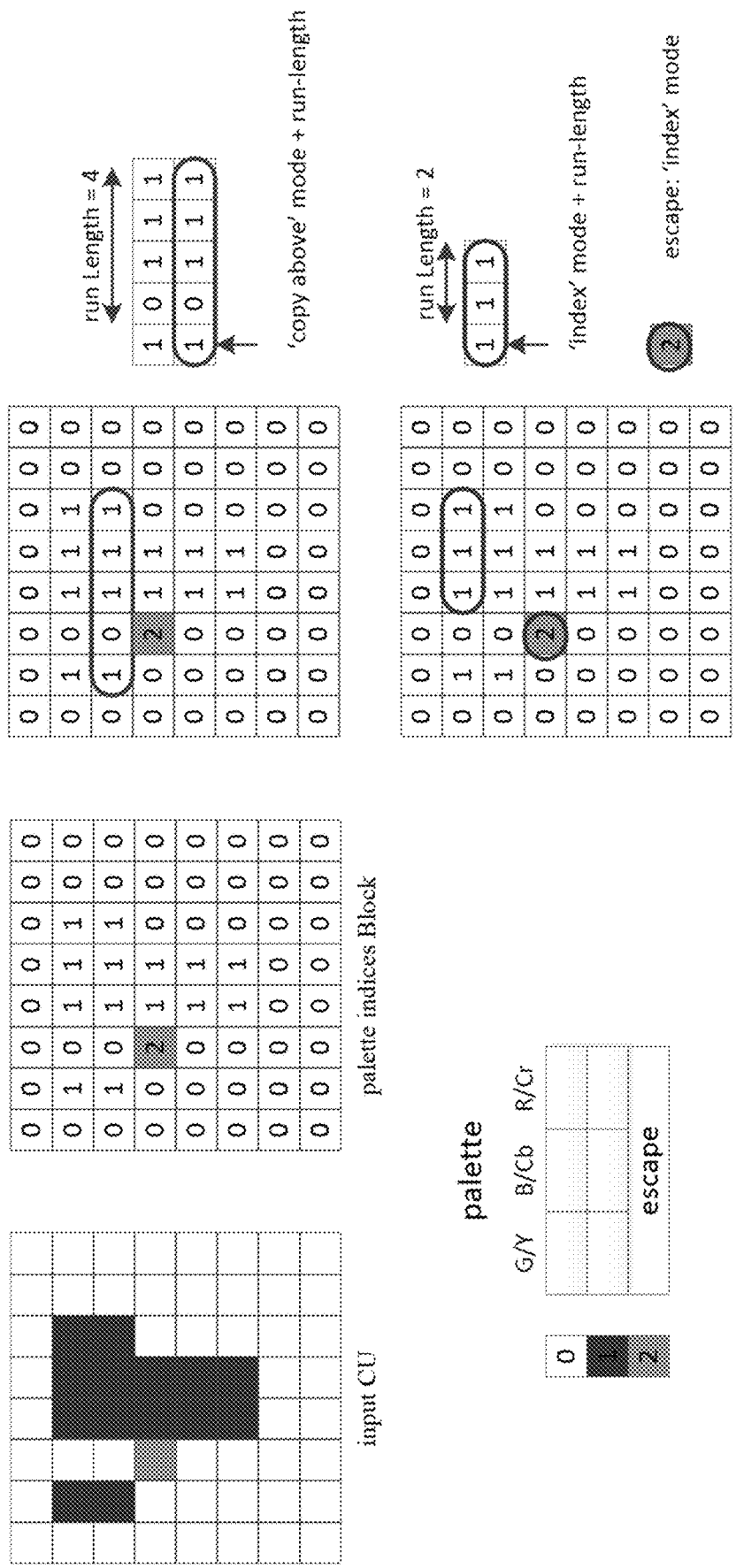
FIG. 5 shows an example of coding of palette indices.

The palette indices are coded using two main palette sample modes: 'INDEX' and 'COPY_ABOVE'. As explained previously, the escape symbol is also signalled as an 'INDEX' mode and assigned an index equal to the maximum palette size. The mode is signalled using a flag except for the top row or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number of subsequent samples that are also coded using the same mode. When escape symbol is part of the run in 'INDEX' or 'COPY_ABOVE' mode, the escape component values are signalled for each escape symbol. The coding of palette indices is illustrated in FIG. 5.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

Figure 6:
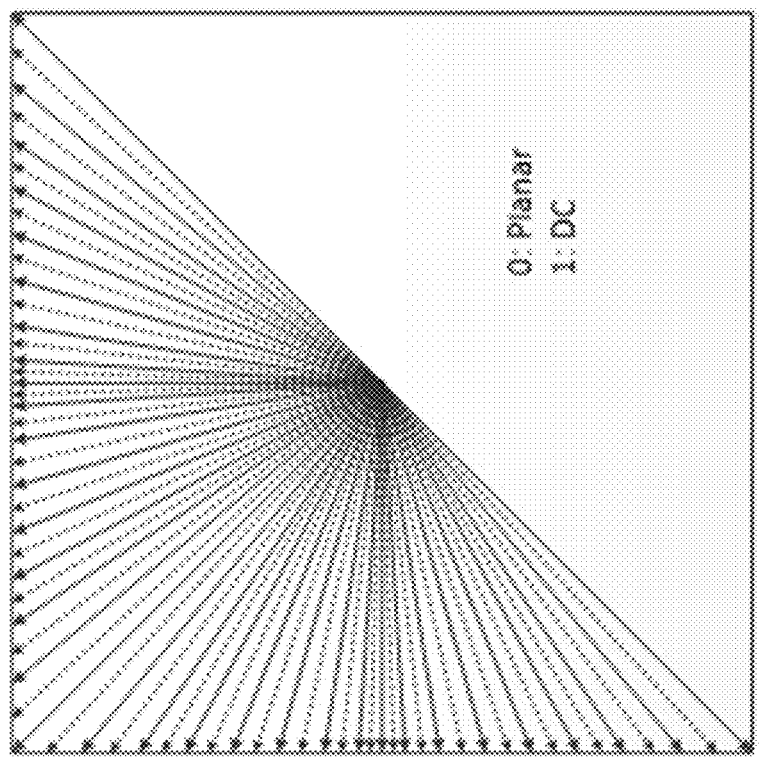
FIG. 6 shows examples of intra prediction modes.

2.6 Intra Prediction in VVC 2.6.1 Intra Mode Coding with 67 Intra Prediction Modes To capture the arbitrary edge directions presented in natural video, the number of directional intra modes in VTM4 is extended from 33, as used in HEVC, to 65. The new directional modes not in HEVC are depicted as red dotted arrows in FIG. 6, and the planar and DC modes remain the same. These denser directional intra prediction modes apply for all block sizes and for both luma and chroma intra predictions.

Figure 7:
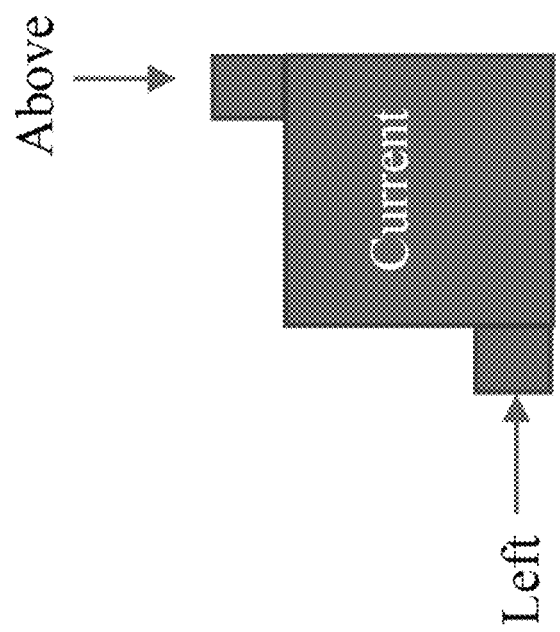
FIG. 7 shows neighbors of a current block.

A unified 6-MPM list is proposed for intra blocks irrespective of whether MRL and ISP coding tools are applied or not. The MPM list is constructed based on intra modes of the left and above neighboring block as in VTM4.0, as shown in FIG. 7.

Suppose the mode of the left is denoted as Left and the mode of the above block is denoted as Above, the unified MPM list is constructed as with the following steps in order:

When the intra prediction mode of a neighboring block is invalid, its intra mode is set to Planar by default.
If Left and Above are the same and both angular:
  MPM list→{Planar, Left, Left −1, Left +1, DC, Left −2}
If Left and Above are different and both angular:
  Set a mode Max as the larger mode in Left and Above
  if the difference of mode Left and Above is in the range of 2 to 62, inclusive
    MPM list→{Planar, Left, Above, DC, Max −1, Max +1}
  Otherwise
    MPM list→{Planar, Left, Above, DC, Max −2, Max +2}
If Left and Above are different and one of modes Left and Above is angular mode, and the other is non-angular:
  Set a mode Max as the larger mode in Left and Above
  MPM list→{Planar, Max, DC, Max −1, Max +1, Max −2}
If both modes Left and Above are non-angular modes:
  MPM list→{Planar, DC, V, H, V−4, V+4}

Note that when the mode index (e.g., Max +2) exceed the range [0, 66], it may be replaced by another valid mode index.

The first MPM candidate, i.e., the Planar mode is signaled separately from the remaining MPM candidates.

2.6.2 Mode Dependent Intra Smoothing (MDIS)

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In the VTM6, simplified 6-bit 4-tap Gaussian interpolation filter is used for only directional intra modes. Non-directional intra prediction process is unmodified. The selection of the 4-tap filters is performed according to the MDIS condition for directional intra prediction modes that provide non-fractional displacements, i.e. to all the directional modes excluding the following: 2, HOR_IDX, DIA_IDX, VER_IDX, 66.

Depending on the intra prediction mode, the following reference samples processing is performed:
1. The directional intra-prediction mode is classified into one of the following groups:
   A. vertical or horizontal modes (HOR_IDX, VER_IDX),
   B. diagonal modes that represent angles which are multiple of 45 degree (2, DIA_IDX, VDIA_IDX),
   C. remaining directional modes;
2. If the directional intra-prediction mode is classified as belonging to group A, then then no filters are applied to reference samples to generate predicted samples;
3. Otherwise, if a mode falls into group B, then a [1, 2, 1] reference sample filter may be applied (depending on the MDIS condition) to reference samples to further copy these filtered values into an intra predictor according to the selected direction, but no interpolation filters are applied;
4. Otherwise, if a mode is classified as belonging to group C, then only an intra reference sample interpolation filter is applied to reference samples to generate a predicted sample that falls into a fractional or integer position between reference samples according to a selected direction (no reference sample filtering is performed).

2.6.3 Cross-component Linear Model Prediction

Figure 8:
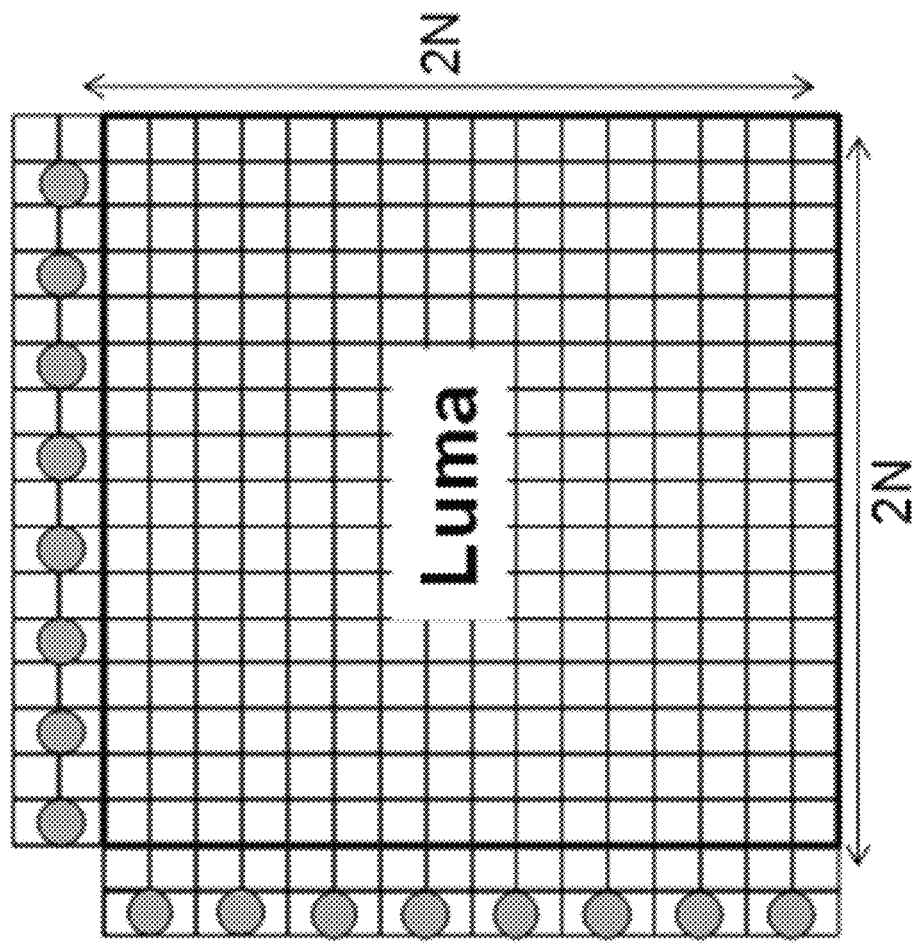
FIG. 8 shows examples of locations of samples used for derivation of model parameters.
Figure 8:
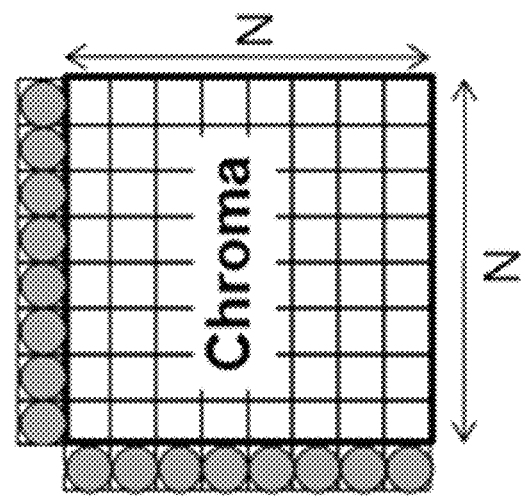
Figure 9B:
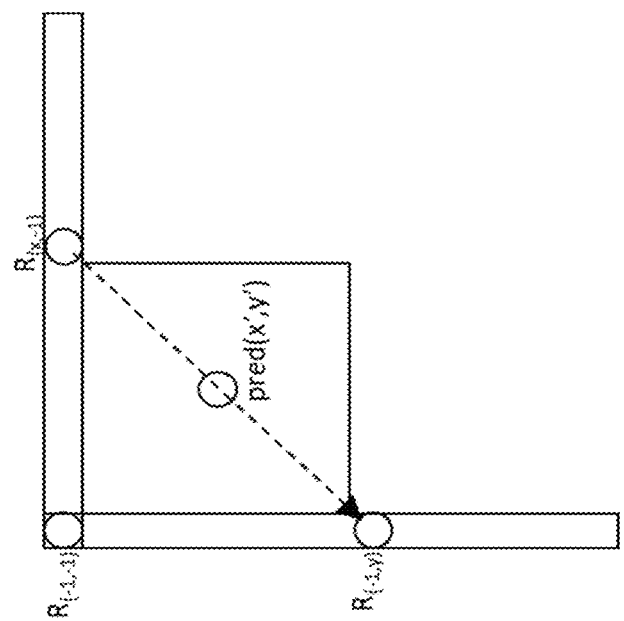
FIGS. 9A-9D show definition of samples used by PDPC applied to diagonal and adjacent angular intra modes.
Figure 9A:
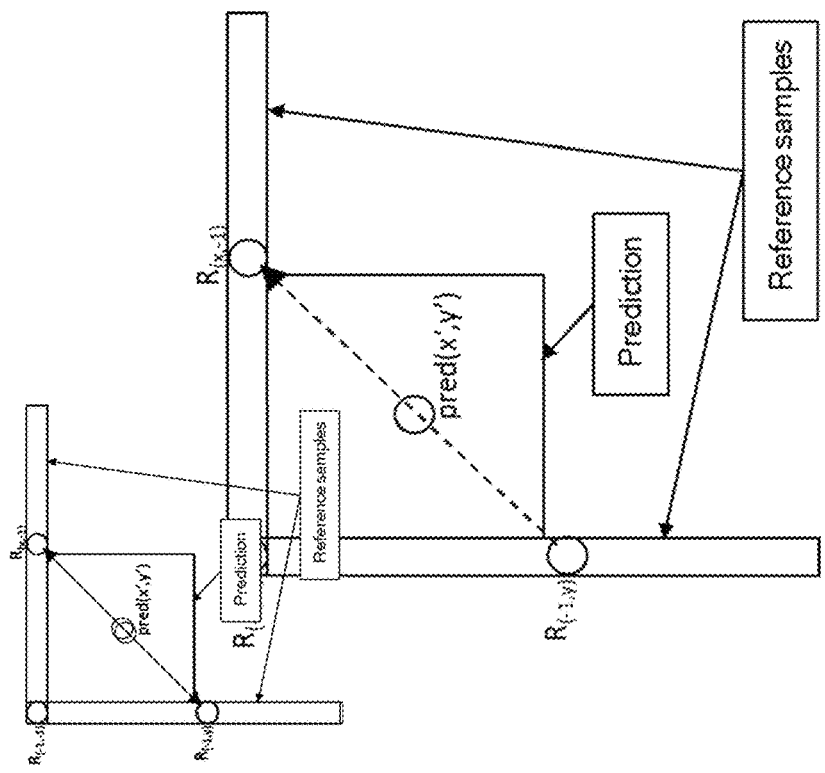
Figure 9D:
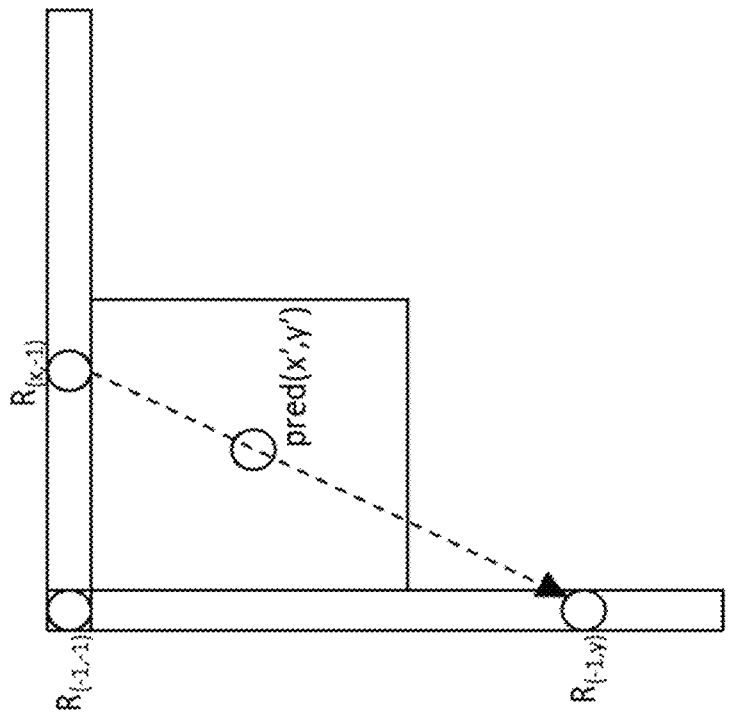
Figure 9C:
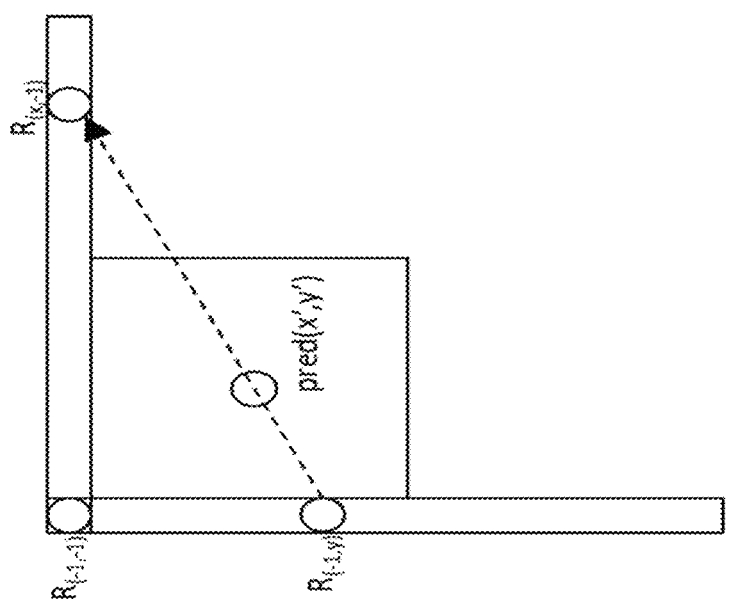

To reduce the cross-component redundancy, a cross-component linear model (CCLM) prediction mode is used in the VTM4, for which the chroma samples are predicted based on the reconstructed luma samples of the same CU by using a linear model as follows:

$$\text{pred}_C(i,j) = \alpha \cdot \text{rec}_L'(i,j) + \beta \qquad (2\text{-}1)$$

where $\text{pred}_C(i,j)$ represents the predicted chroma samples in a CU and $\text{rec}_L(i,j)$ represents the downsampled reconstructed luma samples of the same CU. Linear model parameter $\alpha$ and $\beta$ are derived from the relation between luma values and chroma values from two samples, which are minimum luma sample A $(X_a, Y_a)$ and maximum luma sample B $(X_b, Y_b)$ inside the set of neighboring luma samples. The linear model parameters α and β are obtained according to the following equations.

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \quad (2\text{-}2)$$

$$\beta = \frac{\sum C(n) - \alpha \cdot \sum L(n)}{N} \quad (2\text{-}3)$$

where $X_a$ and $Y_a$ represent luma value and chroma value of the minimum luma sample. And $X_b$ and $Y_b$ indicate luma value and chroma value of the maximum luma sample, respectively. For a coding block with a square shape, the above two equations are applied directly. For a non-square coding block, the neighbouring samples of the longer boundary are first subsampled to have the same number of samples as for the shorter boundary. FIG. 8 shows the location of the left and above samples and the sample of the current block involved in the CCLM mode.

Besides the above template and left template can be used to calculate the linear model coefficients together, they also can be used alternatively in the other 2 LM modes, called LM_A, and LM_L modes.

In LM_A mode, only the above template are used to calculate the linear model coefficients. To get more samples, the above template are extended to (W+H). In LM_L mode, only left template are used to calculate the linear model coefficients. To get more samples, the left template are extended to (H+W).

For a non-square block, the above template are extended to W+W, the left template are extended to H+H.

Note that only one luma line (general line buffer in intra prediction) is used to make the downsampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 2-1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 2-1

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |

TABLE 2-1-continued

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X (0 <= X <= 66) |
| 5 | 82 | 82 | 82 | 82 | 82 |
| 6 | 83 | 83 | 83 | 83 | 83 |
| 7 | 0 | 50 | 18 | 1 | X |

2.6.4 Position Dependent Intra Prediction Combination

In the VTM4, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signalling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the below equation 3-4 as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6 \quad (1\text{-}4)$$

where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIGS. 9A-9D illustrate the definition of reference samples $(R_{x,-1}, R_{-1,y},$ and $R_{-1,-1})$ for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

The PDPC weights are dependent on prediction modes and are shown in Table 2-2.

TABLE 2-2

Example of PDPC weights according to prediction modes

| Prediction modes | wT | wL | wTL |
|---|---|---|---|
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

2.6.5 Multiple Reference Line (MRL) Intra Prediction

Figure 10:
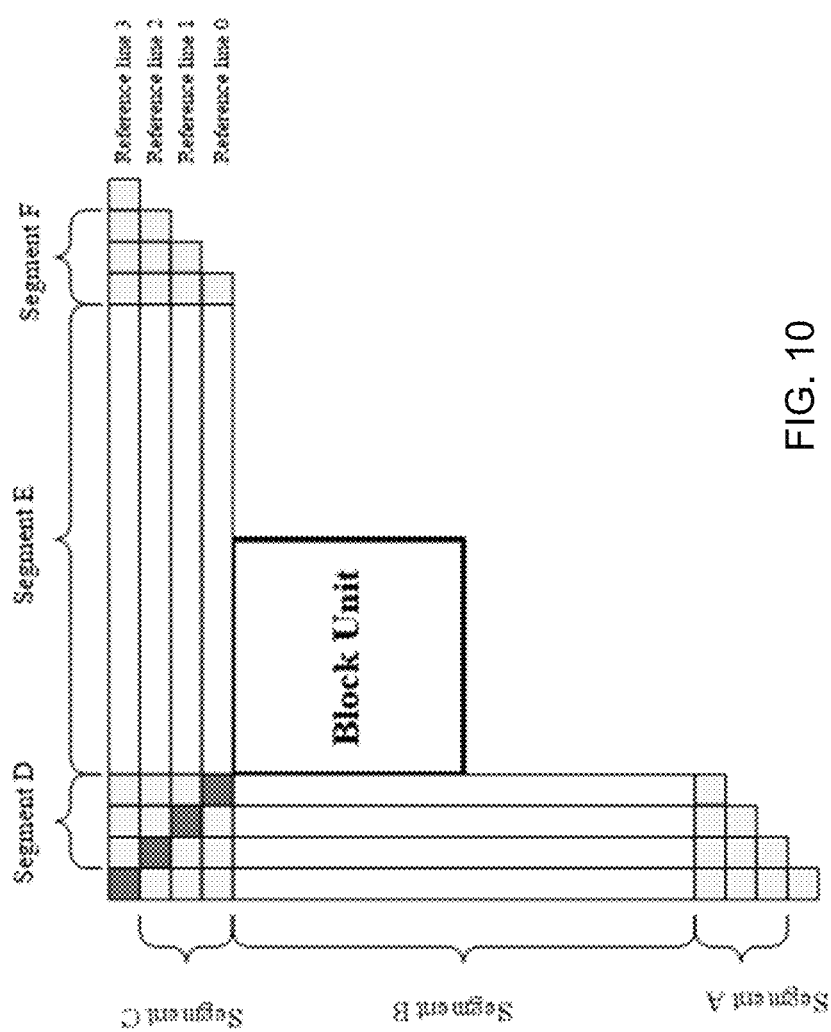
FIG. 10 shows an example of four reference lines neighboring to a prediction block.

Multiple reference line (MRL) intra prediction uses more reference lines for intra prediction. In FIG. 10, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signalled and used to generate intra predictor. For reference line idx, which is greater than 0, only include additional reference line modes in MPM list and only signal mpm index without remaining mode. The reference line index is signalled before intra prediction modes, and Planar and DC modes are excluded from intra prediction modes in case a nonzero reference line index is signalled.

MRL is disabled for the first line of blocks inside a CTU to prevent using extended reference samples outside the current CTU line. Also, PDPC is disabled when additional line is used.

2.6.6 Intra Sub-Partitions (ISP)

Figure 11A:
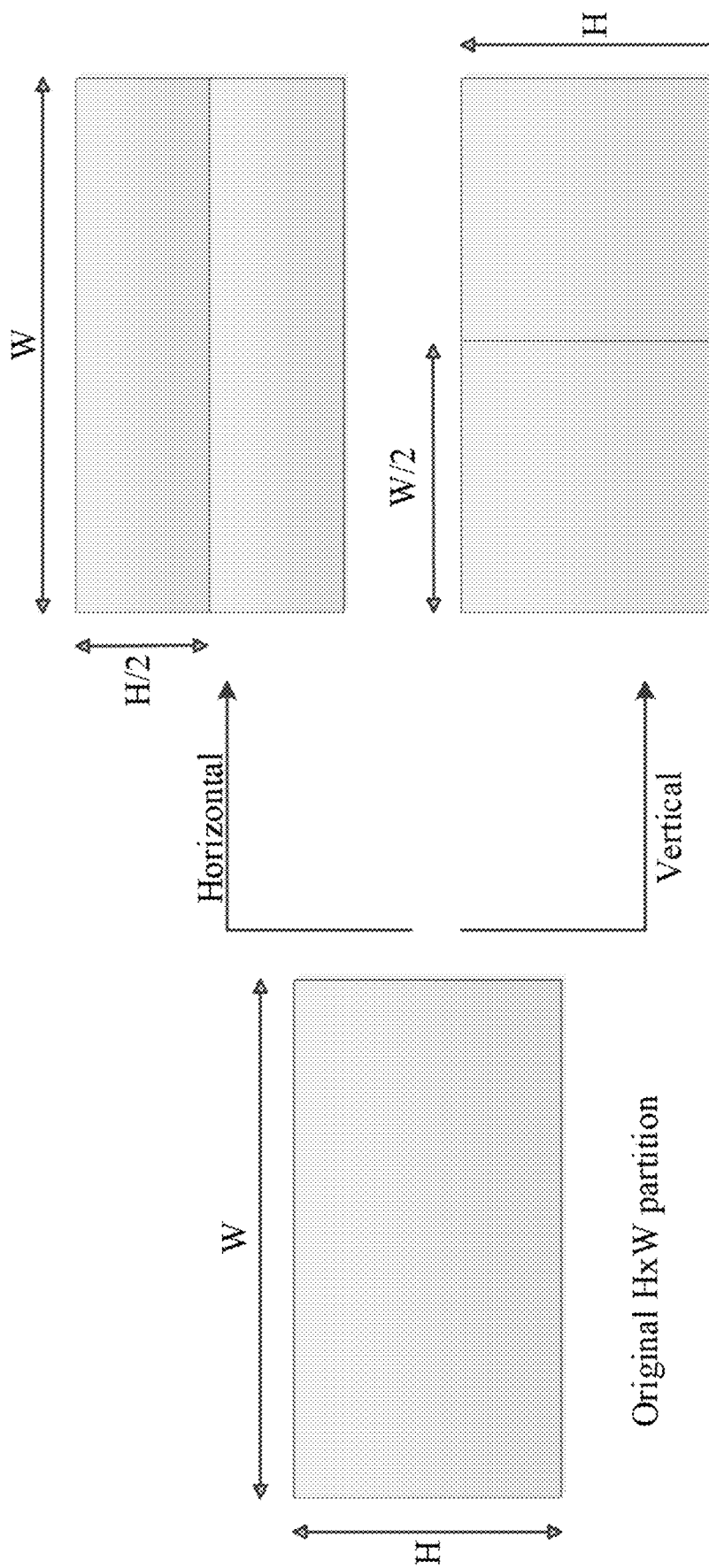
FIG. 11A show examples of sub-partitions for 4×8 and 8×4 CUs.
Figure 11B:
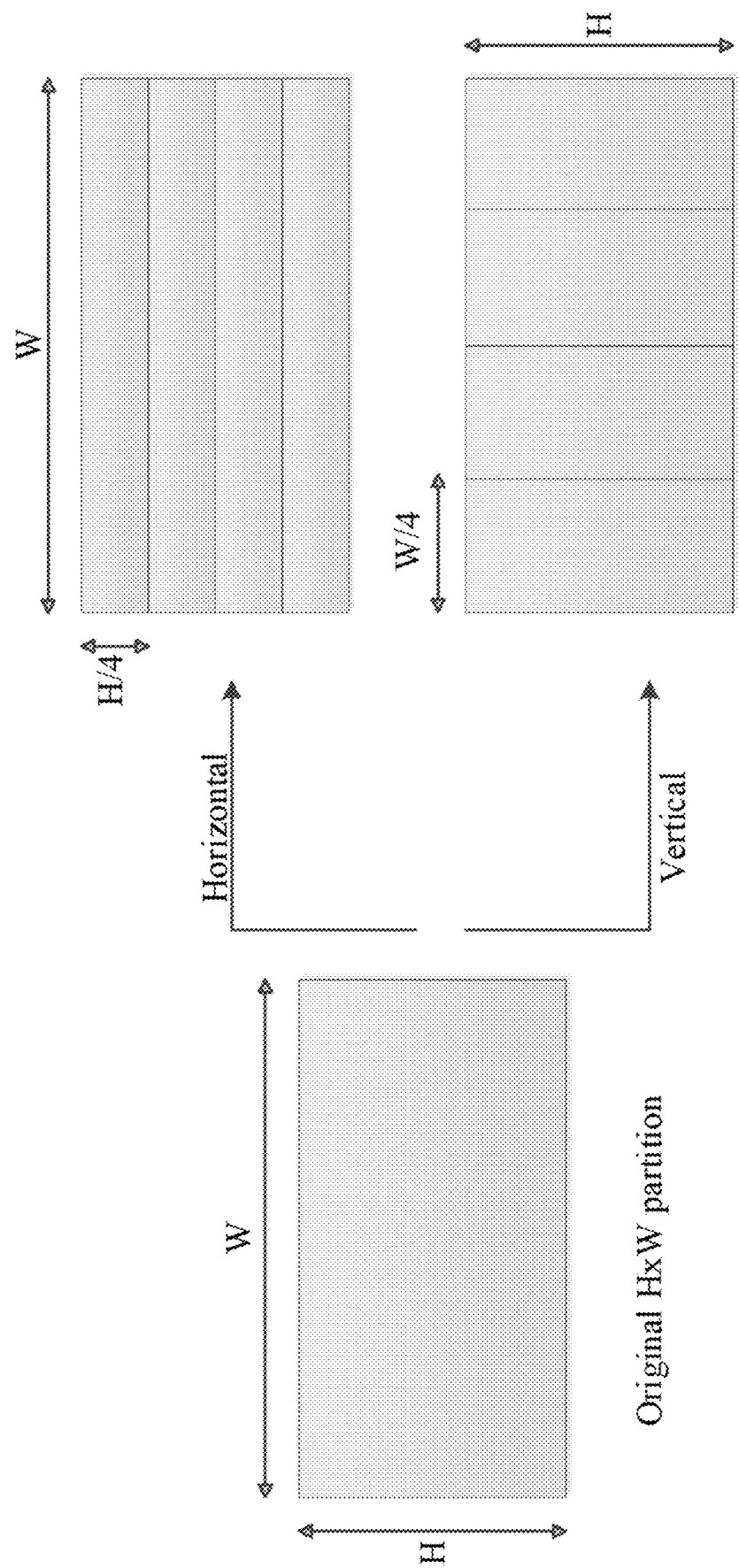
FIG. 11B show examples of sub-partitions for CUs other than 4×8, 8×4 and 4×4.

The Intra Sub-Partitions (ISP) tool divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. FIGS. 11A and 11B show examples of the two possibilities. All sub-partitions fulfill the condition of having at least 16 samples.

TABLE 2-3

Entropy coding coefficient group size

| Block Size | Coefficient group Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode. The followings are summary of interaction of ISP with other coding tools.

Multiple Reference Line (MRL): if a block has an MRL index other than 0, then the ISP coding mode will be inferred to be 0 and therefore ISP mode information will not be sent to the decoder.

Entropy coding coefficient group size: the sizes of the entropy coding sub-blocks have been modified so that they have 16 samples in all possible cases, as shown in Table 2-3. Note that the new sizes only affect blocks produced by ISP in which one of the dimensions is less than 4 samples. In all other cases coefficient groups keep the 4×4 dimensions.

CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.

MPM usage: the MPM flag will be inferred to be one in a block coded by ISP mode, and the MPM list is modified to exclude the DC mode and to prioritize horizontal intra modes for the ISP horizontal split and vertical intra modes for the vertical one.

Transform size restriction: all ISP transforms with a length larger than 16 points uses the DCT-II.

PDPC: when a CU uses the ISP coding mode, the PDPC filters will not be applied to the resulting sub-partitions.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.
If w=2 or w>32, $t_H$=DCT-II
If h=2 or h>32, $t_V$=DCT-II
Otherwise, the transform is selected as in Table 2-4.

TABLE 2-4

Transform selection depends on intra mode

| Intra mode | $t_H$ | $t_V$ |
|---|---|---|
| Planar | DST-VII | DST-VII |
| Ang. 31, 32, 34, 36, 37 | | |
| DC | DCT-II | DCT-II |
| Ang. 33, 35 | | |
| Ang. 2, 4, 6 . . . 28, 30 | DST-VII | DCT-II |
| Ang. 39, 41, 43 . . . 63, 65 | | |
| Ang. 3, 5, 7 . . . 27, 29 | DCT-II | DST-VII |
| Ang. 38, 40, 42 . . . 64, 66 | | |

2.7 Quantized Residual Block Differential Pulse-Code Modulation (QR-BDPCM)

A quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases} \quad (2\text{-}7\text{-}1)$$

For horizontal prediction, similar rules apply, and the residual quantized samples are obtained by $$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases} \quad (2\text{-}7\text{-}2)$$

The residual quantized samples $\tilde{r}_{i,j}$ are sent to the decoder. On the decoder side, the above calculations are reversed to produce $Q(r_{i,j})$, $0 \le i \le M-1$, $0 \le j \le N-1$. For vertical prediction case, $$Q(r_{i,j}) = \Sigma_{k=0}^{i} \tilde{r}_{k,j}, \, 0 \le i \le (M-1), \, 0 \le j \le (N-1) \quad (2\text{-}7\text{-}3)$$

For horizontal case, $$Q(r_{i,j}) = \Sigma_{k=0}^{j} \tilde{r}_{i,k}, \, 0 \le i \le (M-1), \, 0 \le j \le (N-1) \quad (2\text{-}7\text{-}4)$$

The inverse quantized residuals, $Q^{-1}(Q(r_{i,j}))$, are added to the intra block prediction values to produce the reconstructed sample values.

2.8 Matrix Weighted Intra Prediction (MIP)

Figure 12:
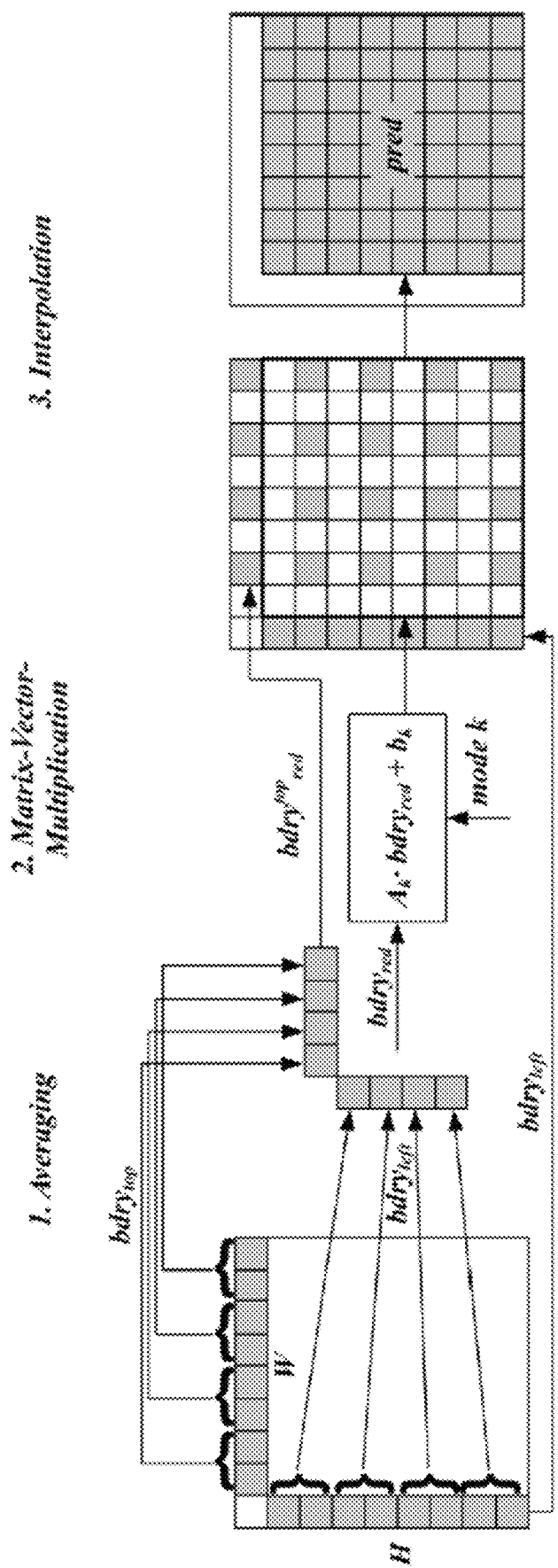
FIG. 12 shows an example of matrix weighted intra prediction process.

Matrix weighted intra prediction (MIP) method is a newly added intra prediction technique into VTM6. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the prediction signal is based on the following three steps, which are averaging, matrix vector multiplication and linear interpolation as shown in FIG. 12.

2.9 Affine Motion Compensated Prediction

Figure 13B:
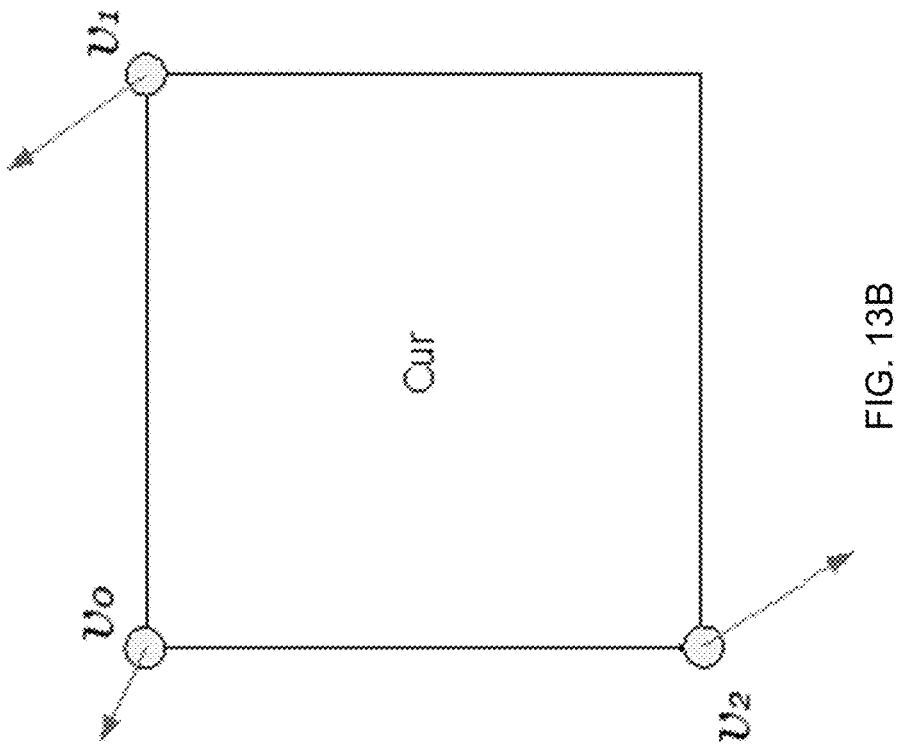
FIGS. 13A and 13B show a 4-parameter affine model and a 6-parameter affine model.
Figure 13A:
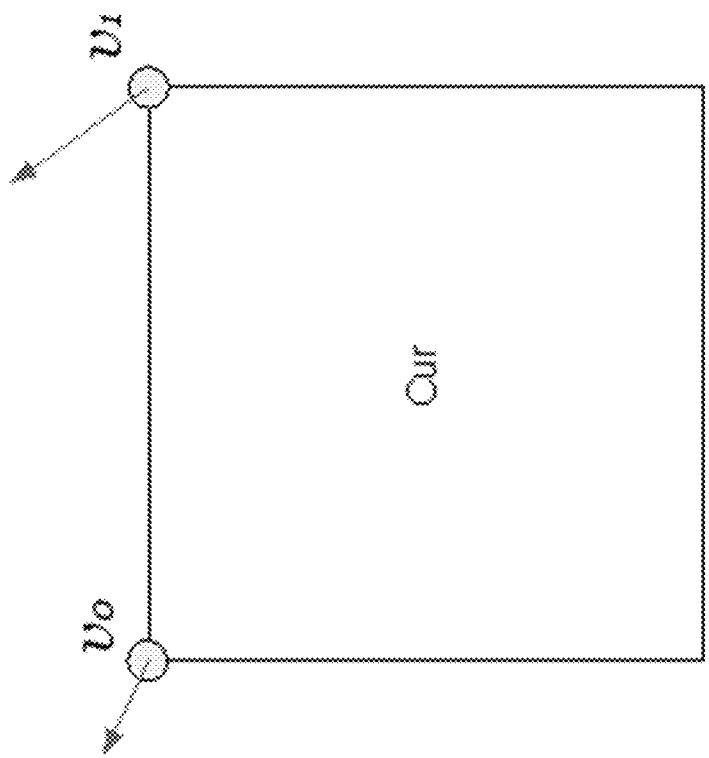

In HEVC, only translation motion model is applied for motion compensation prediction (MCP). While in the real world, there are many kinds of motion, e.g. zoom in/out, rotation, perspective motions and the other irregular motions. In the VTM6, a block-based affine transform motion compensation prediction is applied. As shown FIGS. 13A and 13B, the affine motion field of the block is described by motion information of two control point (4-parameter) or three control point motion vectors (6-parameter).

For 4-parameter affine motion model, motion vector at sample location (x, y) in a block is derived as:

$$\begin{cases} mv_x = \frac{mv_{1x} - mv_{0x}}{W} x + \frac{mv_{1y} - mv_{0y}}{W} y + mv_{0x} \\ mv_y = \frac{mv_{1y} - mv_{0y}}{W} x + \frac{mv_{1y} - mv_{0x}}{W} y + mv_{0y} \end{cases} \quad (3\text{-}17)$$

For 6-parameter affine motion model, motion vector at sample location (x, y) in a block is derived as:

$$\begin{cases} mv_x = \frac{mv_{1x} - mv_{0x}}{W} x + \frac{mv_{2x} - mv_{0x}}{H} y + mv_{0x} \\ mv_y = \frac{mv_{1y} - mv_{0y}}{W} x + \frac{mv_{2y} - mv_{0y}}{H} y + mv_{0y} \end{cases} \quad (3\text{-}1)$$

where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 14:
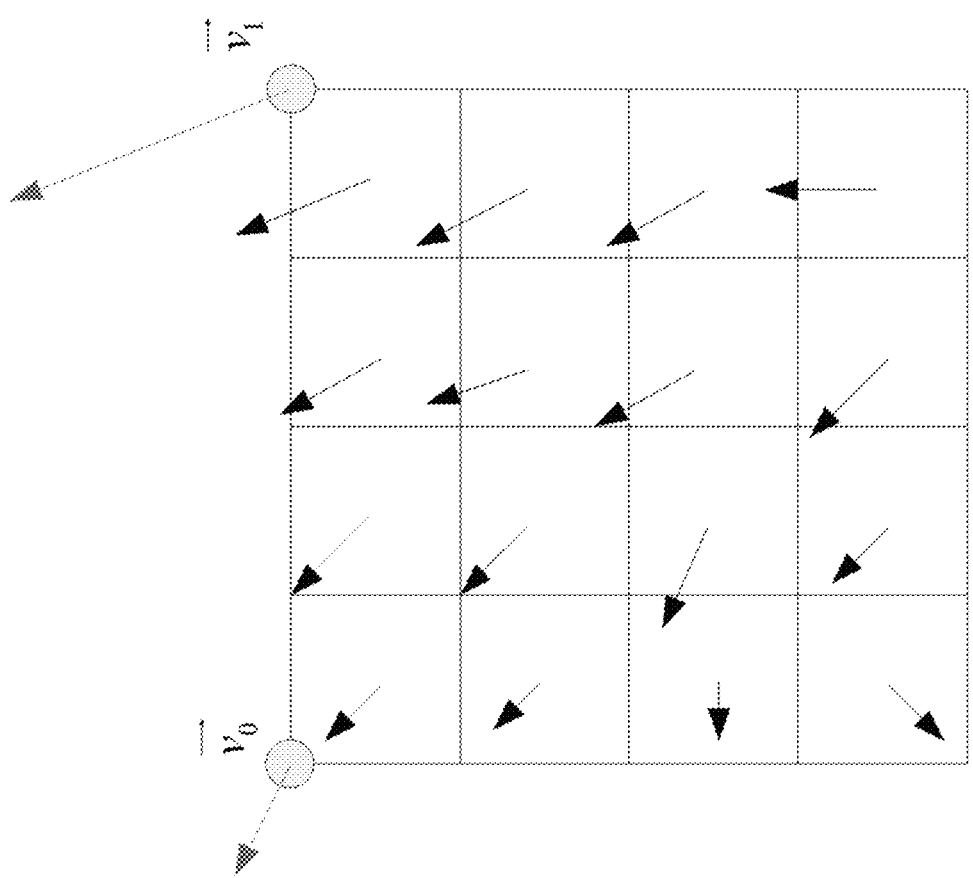
FIG. 14 shows an example of affine MVF per sub-block.

In order to simplify the motion compensation prediction, block based affine transform prediction is applied. To derive motion vector of each 4×4 luma sub-block, the motion vector of the center sample of each sub-block, as shown in FIG. 14, is calculated according to above equations, and rounded to 1/16 fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

As done for translational motion inter prediction, there are also two affine motion inter prediction modes: affine merge mode and affine AMVP mode.

2.10 Local Dual Tree in VVC

In typical hardware video encoders and decoders, processing throughput drops when a picture has more small intra blocks because of sample processing data dependency between neighbouring intra blocks. The predictor generation of an intra block requires top and left boundary reconstructed samples from neighbouring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed.

In VTM5.0, in single coding tree, since chroma partitions always follows luma and the smallest intra CU is 4×4 luma samples, the smallest chroma intra CB is 2×2. Therefore, in VTM5.0, the smallest chroma intra CBs in single coding tree is 2×2. The worst case hardware processing throughput for VVC decoding is only 1/4 of that for HEVC decoding. Moreover, the reconstruction process of a chroma intra CB becomes much more complex than that in HEVC after adopting tools including cross-component linear model (CCLM), 4-tap interpolation filters, position-dependent intra prediction combination (PDPC), and combined inter intra prediction (CIIP). It is challenging to achieve high processing throughput in hardware decoders. In this section, a method that improve the worst case hardware processing throughput is proposed.

The goal of this method is to disallow chroma intra CBs smaller than 16 chroma samples by constraining the partitioning of chroma intra CBs.

In single coding tree, a SCIPU is defined as a coding tree node whose chroma block size is larger than or equal to TH chroma samples and has at least one child luma block smaller than 4TH luma samples, where TH is set to 16 in this contribution. It is required that in each SCIPU, all CBs are inter, or all CBs are non-inter, i.e., either intra or IBC. In case of a non-inter SCIPU, it is further required that chroma of the non-inter SCIPU shall not be further split and luma of the SCIPU is allowed to be further split. In this way, the smallest chroma intra CB size is 16 chroma samples, and 2×2, 2×4, and 4×2 chroma CBs are removed. In addition, chroma scaling is not applied in case of a non-inter SCIPU. In addition, when luma blocks are further split and chroma blocks are not split, a local dual tree coding structure is constructed.

Figures 15A, 15B:
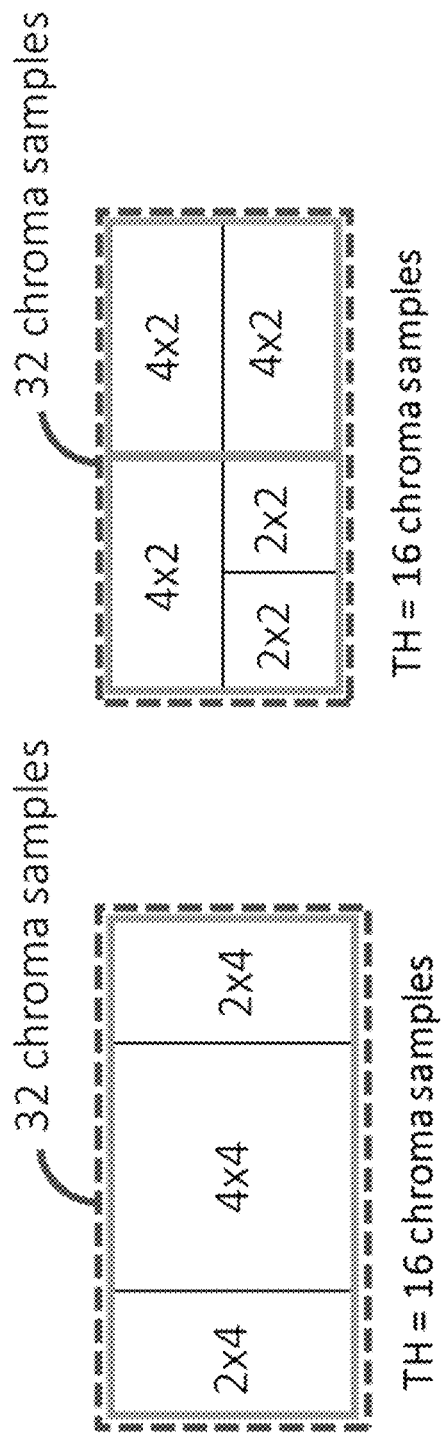
FIGS. 15A and 15B show examples of SCIPU.

Two SCIPU examples are shown in FIGS. 15A and 15B. In FIG. 15A, one chroma CB of 8×4 chroma samples and three luma CBs (4×8, 8×8, 4×8 luma CBs form one SCIPU because the ternary tree (TT) split from the 8×4 chroma samples would result in chroma CBs smaller than 16 chroma samples. In FIG. 15B, one chroma CB of 4×4 chroma samples (the left side of the 8×4 chroma samples) and three luma CBs (8×4, 4×4, 4×4 luma CBs) form one SCIPU, and the other one chroma CB of 4×4 samples (the right side of the 8×4 chroma samples) and two luma CBs (8×4, 8×4 luma CBs) form one SCIPU because the binary tree (BT) split from the 4×4 chroma samples would result in chroma CBs smaller than 16 chroma samples.

In the proposed method, the type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signalled flag before parsing the CUs in the SCIPU.

By applying the above method, the worst-case hardware processing throughput occurs when 4×4, 2×8, or 8×2 chroma blocks, instead of a 2×2 chroma blocks, are processed. The worst-case hardware processing throughput is the same as that in HEVC and is 4× of that in VTM5.0.

3. Problems

Palette, IBC are treated as different prediction modes in addition to the conventional Intra and Inter prediction modes in VVC. Even for HEVC SCC, Palette is treated as Intra prediction mode, however, the signaling is still separately from the normal intra prediction modes (e.g., DC/Planar and angular modes) by a Palette mode flag. For HEVC SCC, IBC is treated as Inter prediction mode by checking whether the signaled/derived reference picture is the current picture. That is, the reference picture list is modified to include current picture as an additional reference picture.

When the codec supports the palette mode, how to code the palette flag become a key factor to the coding performance. Palette flag may have correlations between adjacent blocks. If we only code the palette mode flag without considering the context of neighboring flags, it may lose the coding efficiency.

The chroma intra prediction and transform may need to consider the prediction modes of the luma blocks.

4. Example Embodiments

The embodiments discussed below should be considered as examples to explain general concepts. These embodiments should not be interpreted in a narrow way. Furthermore, these embodiments can be combined in any manner.

In this document, it is proposed to treat a new coding method X (e.g., X being Palette/IBC/QR-BDPCM) as an additional intra prediction mode. Therefore, there is no need to separately signal the enabling/disabling flag of the new coding method.

Figure 16:
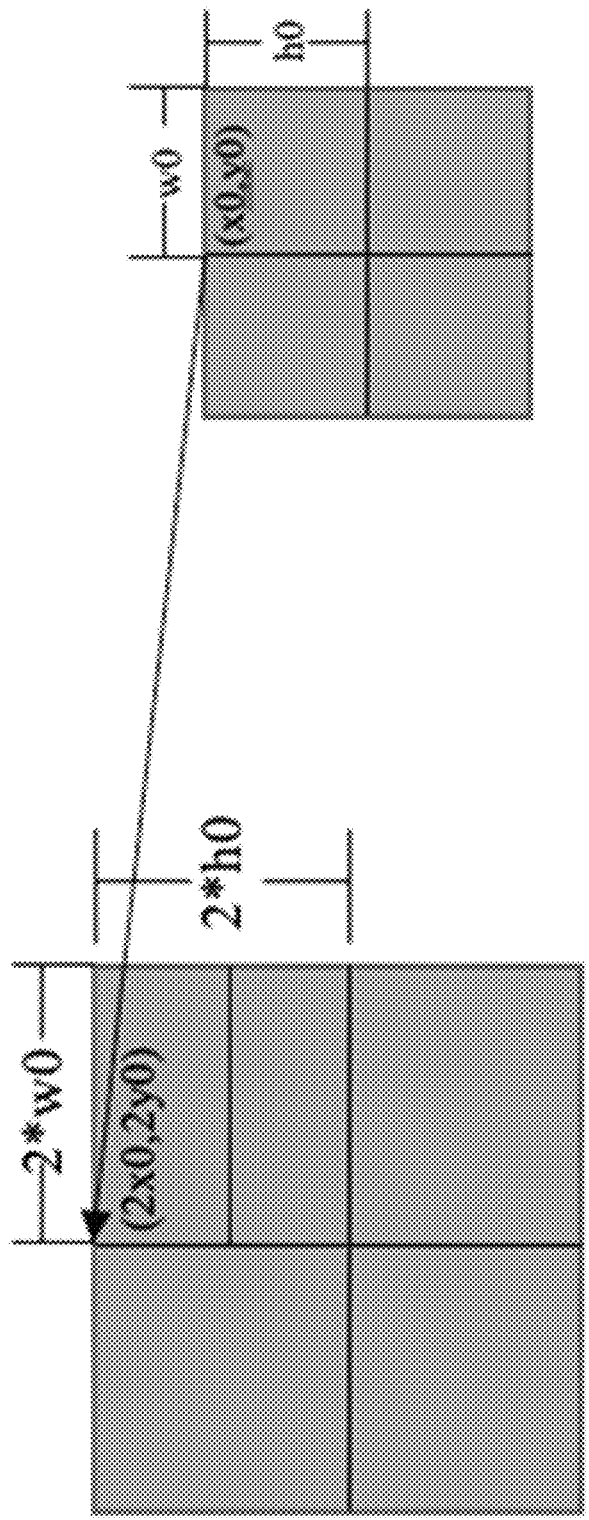
FIG. 16 shows an example of a luma region for 4:2:0 color format.
Figure 17:
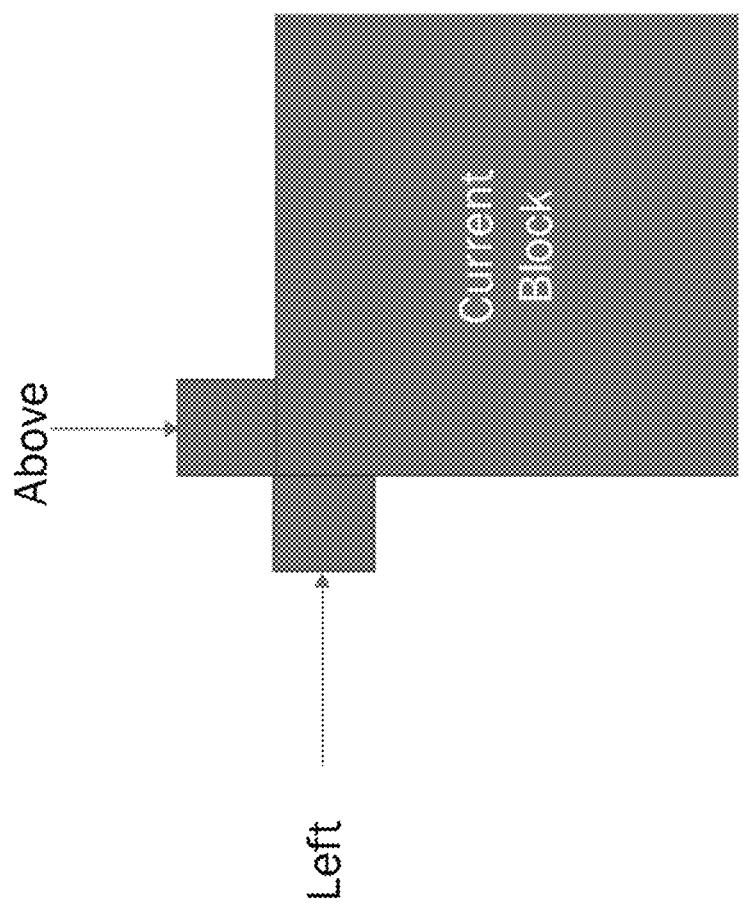
FIG. 17 shows example left and above neighbours of a current block.
Figure 18:
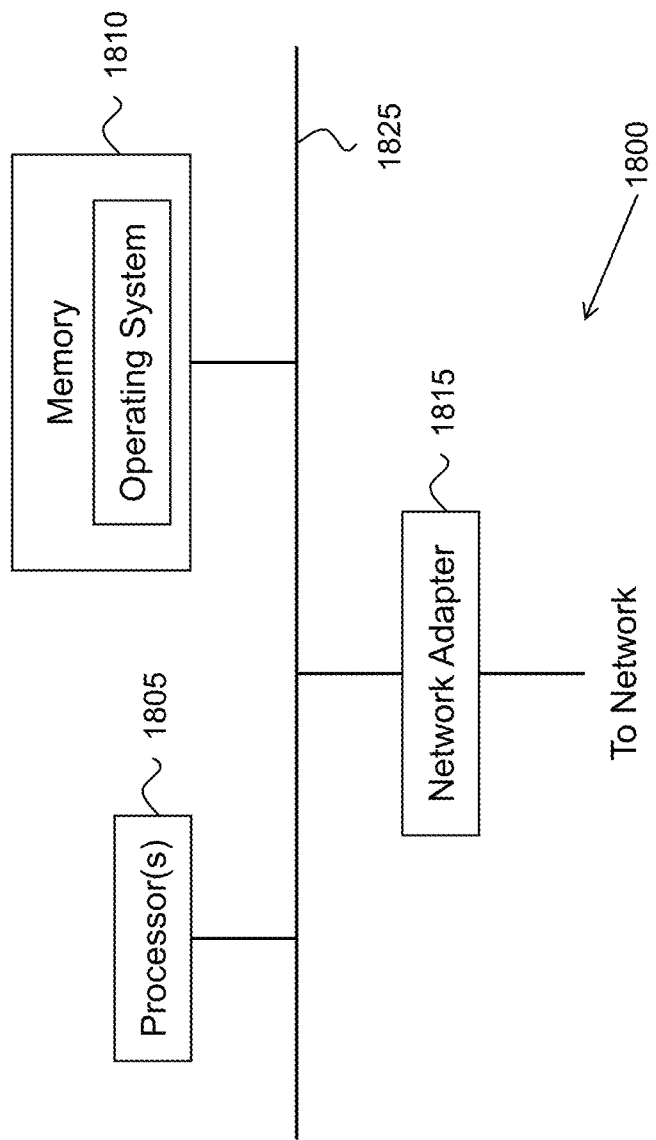
FIG. 18 is a block diagram illustrating an example of the architecture for a computer system or other control device that can be utilized to implement various portions of the presently disclosed technology.

1. The set of allowed intra prediction modes (IPMs) may be further extended to include the new coding methods. Suppose the index range of existing IPMs is [0, M−1], with the proposed methods, the following may apply:
    a. The index range of IPMs may be revised to be [0, M−1+K] wherein K is the number of new coding methods to be treated as part of IPMs.
    b. In one example, the palette mode may be marked as the $Idx_{New}$-th IPM wherein $Idx_{New}$ is within the range of [0, M−1+K].
        i. In one example, the IPM index for the new coding methods may be set to be no smaller than M, that is, the new coding methods are included in the set of IPMs after all existing intra prediction modes.
            1) the palette mode may be set to M (i.e., $Idx_{New}$ is equal to M)
            2) the IBC mode may be set to M or M+1 (i.e., $Idx_{New}$ is equal to M, M+1)
            3) the QR-BDPCM may be set to M or M+1 or M+2 (i.e., $Idx_{New}$ is equal to M, M+1 or M+2)
        ii. In one example, a new coding method may be included in the set of IPMs before one of existing intra prediction modes, that is, $Idx_{New}$ is no greater than M−1.
            1) In one example, a new coding method may be included in the set of IPMs before all existing intra prediction modes.
                a) In one example, the IPM index for the palette mode may be set to 0 (i.e., $Idx_{New}$ is equal to 0).
                b) In one example, the IPM index for the IBC mode may be set to 0 (i.e., $Idx_{New}$ is equal to 0).
                c) In one example, the IPM index for the QR-BDPCM mode may be set to 0 (i.e., $Idx_{New}$ is equal to 0).
            2) Alternatively, furthermore, the indices of remaining IPMs with original index no smaller than $Idx_{New}$ may be revised, e.g., being increased by 1.
        iii. In one example, $Idx_{New}$ may be pre-defined, or signaled or dependent on
            1) block dimension of current block
            2) Current quantization parameter of current block
            3) Indication of the color format (such as 4:2:0, 4:4:4)
            4) Separate/dual coding tree structure
            5) Slice/tile group type and/or picture type
            6) indications signaled in SPS/PPS/picture header/slice header/tile header
    c. In one example, whether and/or how to include a certain coding method to the allowed IPM set may depend on block dimension and/or decoded information.
        i. In one example, for M×N (e.g., 128×128/128×64/64×128) blocks, IPMs corresponding to IBC may be disallowed.
        ii. In one example, for M×N (e.g., 128×128/128×64/64×128) blocks, IPMs corresponding to Palette may be disallowed.
        iii. In one example, for blocks with width larger than K (e.g., K=32) or height larger than L (e.g., L=32), IPMs corresponding to BDPCM may be disallowed.
2. The set of most probable intra modes (MPMs) may include the new coding methods.
    a. In one example, MPM list may be firstly constructed and then modified via replacing a mode in the constructed MPM list by a new coding method different from conventional intra prediction (e.g. IBC/Palette/QR-BDPCM/MIP).
        i. In one example, the new coding method may replace the mode at the first position in the MPM list.
            1) Alternatively, in one example, the new coding method may replace the mode at the last position in the MPM list.

ii. Alternatively, furthermore, the new coding method may be represented by an intra prediction mode index, such as those defined in bullet 1.
iii. Alternatively, furthermore, during the construction of MPM list, if neighboring blocks are coded with the new method, the neighboring block may be marked as unavailable or treated in the same way as those coded with mode inter.
b. In one example, MPM list may be firstly constructed and then modified via adding a new coding mode (e.g. IBC/Palette/QR-BDPCM) to a given position to the list and the size of MPM list may be increased by K where K is the number of new coding modes
  i. the position of new coding modes may depend on
    1) block dimension of current block
    2) prediction mode of current block
    3) Current quantization parameter of current block
    4) The palette flag of neighboring blocks
    5) The intra block copy flags of neighboring blocks
    6) Indication of the color format (such as 4:2:0, 4:4:4)
    7) Separate/dual coding tree structure
    8) Slice/tile group type and/or picture type
    9) Flags in SPS/PPS/Tile header
c. In one example, the MPM list construction process may be modified, so that if a neighboring block is coded with a new coding method, the coding method may be directly added as one of MPMs.
d. In one example, the MPM list construction process may be modified, so that if a neighboring block is coded with a new coding method, an IPM index corresponding to the coding method may be added as one of MPMs.
e. Whether to/how to add the new coding methods to an MPM list may be dependent on block dimension and/or decoded information.
  i. In one example, for certain block sizes, intra prediction modes (IPMs) corresponding to new coding modes may be disallowed to be added to the MPM list.
    1) In one example, for M×N (e.g., 128×128/128×64/64×128) blocks, IPMs corresponding to IBC may be disallowed to be added to the MPM list.
    2) In one example, for M×N (e.g., 128×128/128×64/64×128) blocks, IPMs corresponding to Palette may be disallowed to be derive from the MPM list.
    3) In one example, for blocks with width larger than L (e.g., L=32) or height larger than K (e.g., K=32), IPMs corresponding to BDPCM may be disallowed to be added to the MPM list.
f. In one example, whether and/or how to include a new coding mode in the MPM may depend on the enabling flag of the coding mode in SPS/PPS/VPS/Tile header/Slice header.
3. The filtering process (e.g., deblocking filter, SAO, ALF, Bilateral filter, Hadamard-domain filter) may depend on the intra prediction modes (IPMs).
  a. In one example, the Boundary strength (BS) setting in the deblocking filter may be dependent on the index of IPMs, such as if the index represents Palette mode, BS is set to 0.
4. The intra prediction process and/or transform process of a chroma block may be modified when the chroma block is determined as a screen content block.
  a. In one example, a chroma block may be determined as a screen content block when one or multiple selected luma blocks are coded with IBC mode or palette mode.
    i. In one example, the size of the selected luma block may be the smallest CU/PU/TU size or the unit for motion/mode storage (such as 4×4).
    ii. In one example, a selected luma block may be the CU/PU/TU covering the center, top left, top right, bottom left or bottom right position of the corresponding luma region. An example of a corresponding luma region is shown in the following FIG. 16.
    iii. In one example, suppose the top-left coordinate of current chroma block is (x0, y0), width and height of the current chroma block is w0 and h0, respectively. The coordinate of top-left sample in the corresponding luma region, width and height of the corresponding luma region may be scaled according to the color format.
      1) for the 4:2:0 color format, the top-left coordinate of the collocated luma region is (2*x0, 2*y0), its width and height are 2*w0 and 2*h0, respectively.
      2) for the 4:4:4 color format, the top-left coordinate of the collocated luma region is (x0, y0), its width and height are w0 and h0, respectively.
    iv. Suppose the top-left coordinate of the collocated luma region is (x, y) and its width and height are W and H, then coordinate of the center position may be:
      1) (x+W/2, y+H/2)
      2) (x+W/2−1, y+H/2−1)
      3) (x+W/2, y+H/2−1)
      4) (x+W/2−1, y+H/2)
    v. Suppose the top-left coordinate of the collocated luma region is (x, y) and its width and height are W and H, then coordinate of the top-left position may be (x, y).
    vi. Suppose the top-left coordinate of the collocated luma region is (x, y) and its width and height are W and H, then coordinate of the top-right position may be:
      1) (x+W, y)
      2) (x+W−1, y)
    vii. Suppose the top-left coordinate of the collocated luma region is (x, y) and its width and height are W and H, then coordinate of the bottom-left position may be:
      1) (x, y+H)
      2) (x, y+H−1)
    viii. Suppose the top-left coordinate of the collocated luma region is (x, y) and its width and height are W and H, then coordinate of the bottom-right position may be:
      1) (x+W, y+H)
      2) (x+W, y+H−1)
      3) (x+W−1, y+H)
      4) (x+W−1, y+H−1)
  b. In one example, certain IPMs (e.g., the DC and/or PLANAR modes) may be not allowed when a chroma block is determined as a screen content block.
    i. Alternatively, in one example, the VER and/or HOR modes may be not allowed when a chroma block is determined as a screen content block.

ii. Alternatively, in one example, the derived mode may be not allowed when a chroma block is determined as a screen content block.
c. In one example, the PDPC may be not allowed when a chroma block is determined as a screen content block.
d. In one example, the MDIS may be not allowed when a chroma block is determined as a screen content block.
5. It is proposed to align the positions of left neighboring block and/or above neighboring block employed in the context derivation for some syntax elements with the positions of neighboring left block and/or above neighboring block used in the MPM derivation.
   a. In one example, the syntax elements may be related to the split flags, the mode constrain flags, the skip flag, the prediction mode flag, the IBC flag and the MIP flag, the affine merge flag and affine inter flag.
   b. The positions of left neighboring block and/or above neighboring block employed in the context derivation for some syntax elements may be aligned with that used in the merge/AMVP candidate list derivation process.
   c. In one example, the positions of neighboring left block and/or above block employed in the context derivation for the above syntax elements may be the left/above neighboring blocks shown in FIG. 7.
6. It is proposed to signal the indication of usage of palette modes using more than 1 context.
   a. In one example, the context derivation for the indication of usage of palette modes may be based on the left/above neighboring blocks. Let denote A be the palette flag of the left neighboring block and B be the above neighboring block.
      i. In one example, the context index for the indication of usage of palette modes may be derived by A*2+B.
         1) Alternatively, in one example, the context index for the indication of usage of palette modes may be derived by A+B.
      ii. In one example, the positions to derive left and above neighboring blocks used in the MPM derivation may be used to derive the context for coding the palette mode flag.
      iii. In one example, the positions to derive left and above neighboring blocks used to derive the context for coding the palette mode flag may be the positions shown in FIG. 17.
7. Whether and/or how apply the above methods may be based on:
   a. Video contents (e.g. screen contents or natural contents)
   b. A message signaled in the DPS/SPSNPS/PPS/APS/picture header/slice header/tile group header/Largest coding unit (LCU)/Coding unit (CU)/LCU row/group of LCUs/TU/PU block/Video coding unit
   c. Position of CU/PU/TU/block/Video coding unit
   d. Block dimension of current block and/or its neighboring blocks
   e. Block shape of current block and/or its neighboring blocks
   f. Indication of the color format (such as 4:2:0, 4:4:4, RGB or YUV)
   g. Coding tree structure (such as dual tree or single tree)
   h. Slice/tile group type and/or picture type
   i. Color component (e.g. may be only applied on luma component and/or chroma component)
   j. Temporal layer ID
   k. Profiles/Levels/Tiers of a standard FIG. 18 is a block diagram illustrating an example of the architecture for a computer system or other control device 1800 that can be utilized to implement various portions of the presently disclosed technology. In FIG. 18, the computer system 1800 includes one or more processors 1805 and memory 1810 connected via an interconnect 1825. The interconnect 1825 may represent any one or more separate physical buses, point to point connections, or both, connected by appropriate bridges, adapters, or controllers. The interconnect 1825, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1805 may include central processing units (CPUs) to control the overall operation of, for example, the host computer. In certain embodiments, the processor(s) 1805 accomplish this by executing software or firmware stored in memory 1810. The processor(s) 1805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1810 can be or include the main memory of the computer system. The memory 1810 represents any suitable form of random access memory (RAM), read-only memory (ROM), flash memory, or the like, or a combination of such devices. In use, the memory 1810 may contain, among other things, a set of machine instructions which, when executed by processor 1805, causes the processor 1805 to perform operations to implement embodiments of the presently disclosed technology.

Also connected to the processor(s) 1805 through the interconnect 1825 is a (optional) network adapter 1815. The network adapter 1815 provides the computer system 1800 with the ability to communicate with remote devices, such as the storage clients, and/or other storage servers, and may be, for example, an Ethernet adapter or Fiber Channel adapter.

Figure 19:
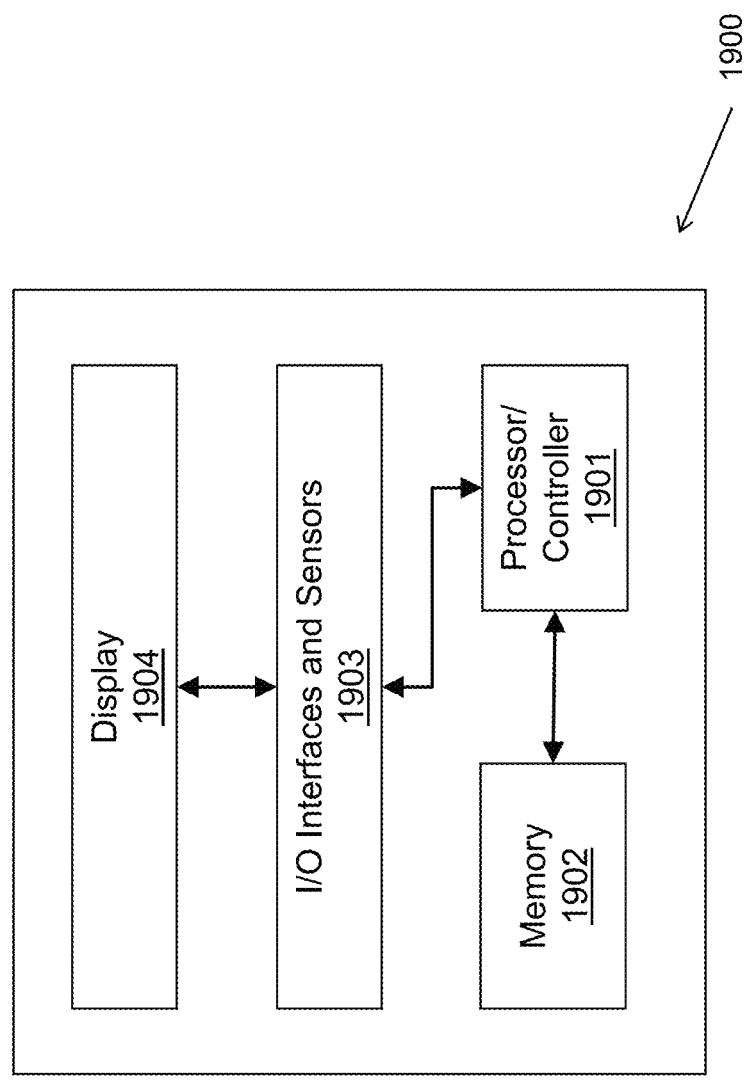
FIG. 19 shows a block diagram of an example embodiment of a mobile device that can be utilized to implement various portions of the presently disclosed technology.

FIG. 19 shows a block diagram of an example embodiment of a mobile device 1900 that can be utilized to implement various portions of the presently disclosed technology. The mobile device 1900 can be a laptop, a smartphone, a tablet, a camcorder, or other types of devices that are capable of processing videos. The mobile device 900 includes a processor or controller 1901 to process data, and memory 1902 in communication with the processor 1901 to store and/or buffer data. For example, the processor 1901 can include a central processing unit (CPU) or a microcontroller unit (MCU). In some implementations, the processor 1901 can include a field-programmable gate-array (FPGA). In some implementations, the mobile device 1900 includes or is in communication with a graphics processing unit (GPU), video processing unit (VPU) and/or wireless communications unit for various visual and/or communications data processing functions of the smartphone device. For example, the memory 1902 can include and store processor-executable code, which when executed by the processor 1901, configures the mobile device 1900 to perform various operations, e.g., such as receiving information, commands, and/or data, processing information and data, and transmitting or providing processed information/data to another device, such as an actuator or external display. To support various functions of the mobile device 1900, the memory 1902 can store information and data, such as instructions, software, values, images, and other data processed or referenced by the processor 1901. For example, various types of Random Access Memory (RAM) devices, Read Only Memory (ROM) devices, Flash Memory devices, and other suitable storage media can be used to implement storage functions of the memory 1902. In some implementations, the mobile device 1900 includes an input/output (I/O) unit 1903 to interface the processor 1901 and/or memory 1902 to other modules, units or devices. For example, the I/O unit 1903 can interface the processor 1901 and memory 1902 with to utilize various types of wireless interfaces compatible with typical data communication standards, e.g., such as between the one or more computers in the cloud and the user device. In some implementations, the mobile device 1900 can interface with other devices using a wired connection via the I/O unit 1903. The mobile device 1900 can also interface with other external interfaces, such as data storage, and/or visual or audio display devices 1904, to retrieve and transfer data and information that can be processed by the processor, stored in the memory, or exhibited on an output unit of a display device 1904 or an external device. For example, the display device 1904 can display a video frame modified based on the MVPs in accordance with the disclosed technology.

Figure 20:
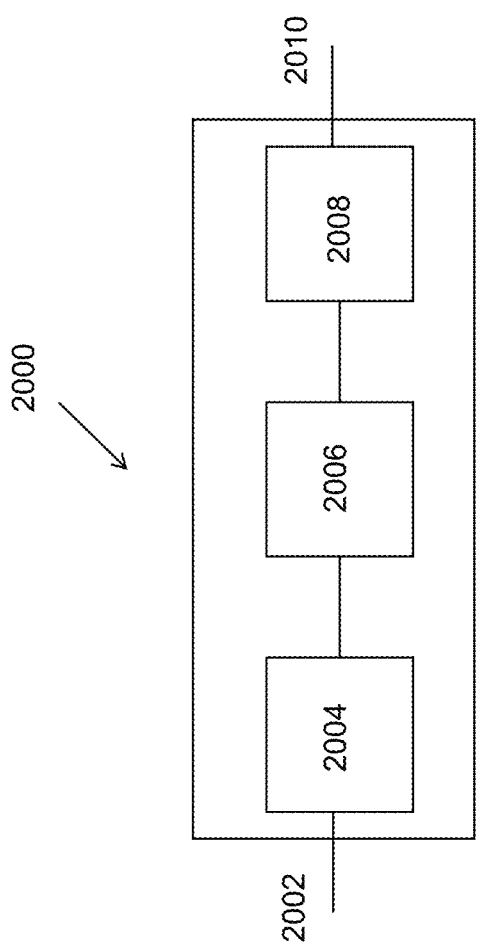
FIG. 20 is a block diagram of an example video processing system in which disclosed techniques may be implemented.

FIG. 20 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2000 may include a coding component 2004 that may implement the various coding or encoding methods described in the present document. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 21:
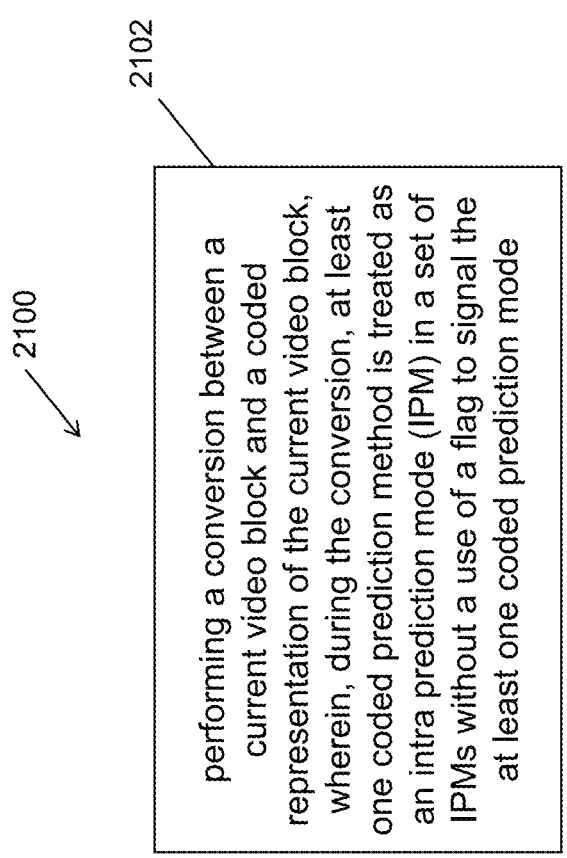
FIG. 21 shows a flowchart of an example method for video processing.

FIG. 21 shows a flowchart of an example method for video processing. The method includes performing (2102) a conversion between a current video block and a coded representation of the current video block, wherein, during the conversion, at least one coded prediction method is treated as an intra prediction mode (IPM) in a set of IPMs without a use of a flag to signal the at least one coded prediction mode.

Some embodiments of the disclosed technology are presented in clause-based format.

1. A method of video processing, comprising:
performing a conversion between a current video block and a coded representation of the current video block, wherein, during the conversion, at least one coded prediction method is treated as an intra prediction mode (IPM) in a set of IPMs without a use of a flag to signal the at least one coded prediction mode.

2. The method of clause 1, wherein the at least one coded prediction method corresponds to one of: a palette mode, an intra block copy (IBC) mode, or a quantized residual block differential pulse-code modulation mode (QR-BDPCM).

3. The method of clause 2, wherein the set of IPMs is associated with an index range [0, M−1], further comprising:
revising the index range to be [0, M−1+K], wherein K is a number of at least one coded prediction method to be treated as part of the set of IPMs.

4. The method of clause 3, wherein, if the at least one coded prediction method corresponds to the palette mode, further comprising:
mapping, in the index range, the palette mode to index value M.

5. The method of clause 3, wherein, if the at least one coded prediction method corresponds to the IBC mode, further comprising:
mapping, in the index range, the IBC mode to index value M or M+1.

6. The method of clause 3, wherein, if the at least one coded prediction method corresponds to the QR-BDPCM mode, further comprising:
mapping, in the index range, the IBC mode to index value M, M+1, or M+2.

7. The method of clause 3, wherein, the at least one coded prediction method is mapped to an index value less than or equal to M−1.

8. The method of any of clauses 1-7, wherein treating the at least one coded prediction method as the IPM is selectively allowed or disallowed, based at least in part on one or more conditions.

9. The method of clause 8, wherein the one or more conditions relate to: a dimension of the current video block, a quantization parameter of the current video block, a color format of the current video block, a coding tree structure associated with the current video block, a type of slice/tile group/picture associated with the current video block, or a flag signaled in SPS/PPS/picture header/slice header/tile header.

10. A method of video processing, comprising:
performing a conversion between a current video block and a coded representation of the current video block, wherein, during the conversion, at least one coded prediction method is treated as an intra prediction mode (IPM) in a list of most probable modes (MPMs) without a use of a flag to signal the at least one coded prediction mode.

11. The method of clause 10, further comprising:
constructing the list of MPMs; and
replacing a mode in the list of MPMs with the at least one coded prediction method.

12. The method of clause 11, wherein the at least one coded prediction method replaces a last mode in the list.

13. The method of clause 11, wherein the at least one coded prediction method replaces a first mode in the list.

14. The method of clause 11, wherein the constructing includes:
marking a neighboring block of the current video block as unavailable, if the neighboring block is coded according to the at least one coded prediction method.

15. The method of clause 11, wherein the constructing includes:
treating a neighboring block as an inter coded block, if the neighboring block is coded according to the at least one coded prediction method.

16. The method of clause 15, wherein the at least one coded prediction method replaces a mode at a position in the list.

17. The method of any of clauses 10-16, further comprising:
adding, in the list, an IPM index corresponding to the at least one prediction method.

18. The method of any of clauses 10-17, wherein treating the at least one coded prediction method as the IPM is selectively allowed or disallowed, based at least in part on one or more conditions.

19. The method of clause 18, wherein the position in the list corresponding to the at least one coded prediction method relates to: a dimension of the current video block, a quantization parameter of the current video block, a color format of the current video block, a coding tree structure associated with the current video block, a type of slice/tile group/picture associated with the current video block, or a flag signaled in SPS/PPS/picture header/slice header/tile header.

20. The method of any of clauses 10-19, further comprising:
setting parameters of a filtering step based in part on an index corresponding to the at least one coded prediction method.

21. The method of clause 20, wherein the parameters include a boundary strength (BS) of a deblocking filter.

22. The method of clause 21, wherein, if the at least one coded prediction method is a palette mode, BS is set to zero.

23. The method of any of clauses 1-22, further comprising:
upon determining that the current video block is a screen content block, modifying an IPM step or a transform process.

24. The method of clause 23, wherein the determining that the current video block is a screen content block includes determining that one or more luma blocks are coded with an IBC mode or a palette mode.

25. The method of clause 24, wherein position dependent intra prediction combination (PDPC) is disallowed for a chroma block.

26. A method of video processing, comprising:
performing a conversion between a current video block and a coded representation of the current video block, wherein, during the conversion, in a palette mode, a context for a syntax element associated with the current video block is derived from a neighboring block used in deriving a list of MPMs; and
aligning a position of the neighboring block with a position of the current video block.

27. The method of clause 26, wherein a context for a syntax element associated with the current video block corresponds to coding a flag for the palette m ode.

28. The method of clause 26, wherein the neighboring block includes at least one of: a left neighboring block or a top neighboring block.

29. The method of clause 26, wherein the palette mode includes a use of multiple contexts, and further wherein the use of the multiple contexts is signaled in the coded representation.

30. The method of any of clauses 26-29, wherein deriving the context is selectively allowed or disallowed, based at least in part on one or more conditions.

31. The method of clause 30, wherein the one or more conditions relate to: contents of the current video block, a flag signaled in DPS/SPSNPS/PPS/APS/picture header/slice header/tile group header/Largest coding unit (LCU)/Coding unit (CU)/LCU row/group of LCUs/TU/PU block/Video coding unit, a position of CU/PU/TU associated with the current video block, a dimension of the current video block and/or the neighboring block, a shape of the current video block and/or the neighboring block, a color format of the current video block, a coding tree structure associated with the current video block, a type of slice/tile group/picture associated with the current video block, a color component of the current video block, a temporal layer ID of the current video block, or a profile level of the current video block.

32. A video decoding apparatus comprising a processor configured to implement a method recited in one or more of clauses 1 to 31.

33. A video encoding apparatus comprising a processor configured to implement a method recited in one or more of clauses 1 to 31.

34. A computer program product having computer code stored thereon, the code, when executed by a processor, causes the processor to implement a method recited in any of clauses 1 to 31.

35. A method, apparatus or system described in the present document.

Figure 22:
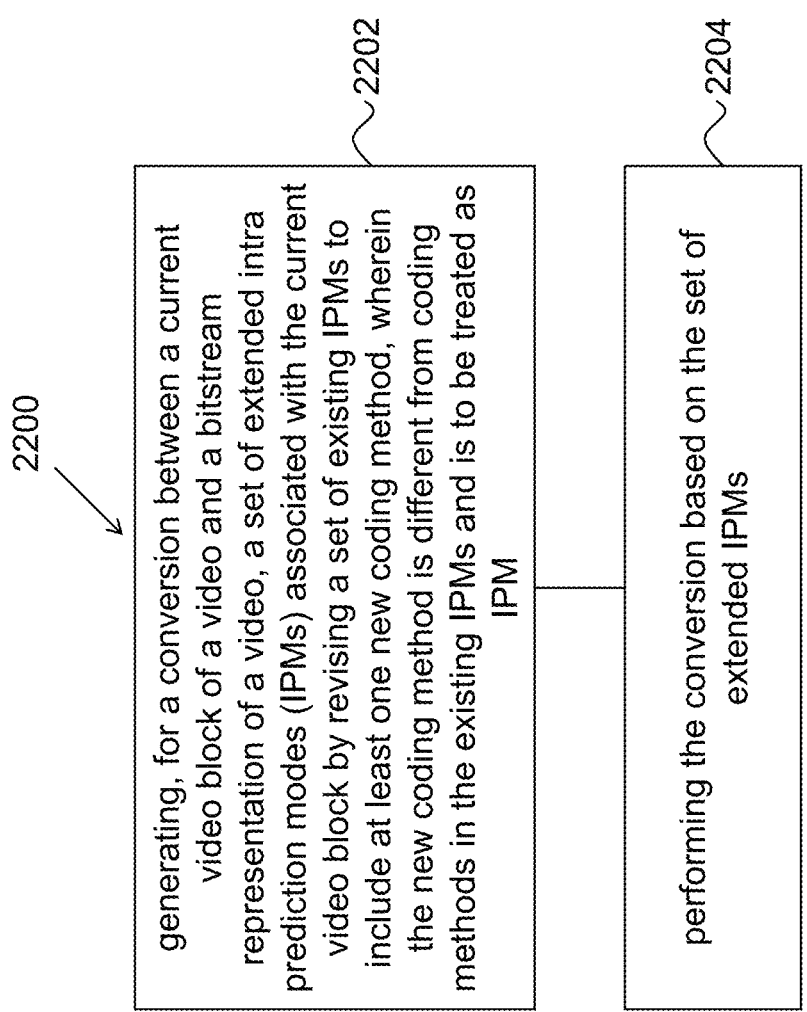
FIG. 22 shows a flowchart of an example method for video processing.

FIG. 22 shows a flowchart of an example method for video processing. The method includes generating(2202), for a conversion between a current video block of a video and a bitstream representation of a video, a set of extended intra prediction modes (IPMs) associated with the current video block by revising a set of existing IPMs to include at least one new coding method, wherein the new coding method is different from coding methods in the existing IPMs and is to be treated as IPM; and performing (2204) the conversion based on the set of extended IPMs.

In some examples, the set of extended IPMs is signaled with same flag.

In some examples, the at least one new coding method include at least one of: a palette mode, an intra block copy (IBC) mode, and a quantized residual block differential pulse-code modulation mode (QR-BDPCM).

In some examples, the index range of the set of existing IPMs is [0, M−1], and the index range of the set of extended IPMs is revised to be [0, M−1+K], wherein K is a number of the at least one new coding method to be included in the set of extended IPMs, wherein M and K are integers.

In some examples, the at least one new coding method is marked as the $Idx_{New}$-th IPM, wherein the IPM index for the at least one new coding method $Idx_{New}$ is within the range of [0, M−1+K].

In some examples, the at least one new coding method is included in the set of extended IPMs after all existing IPMs.

In some examples, the IPM index for the palette mode is set to M.

In some examples, the IPM index for the IBC mode is set to M or M+1.

In some examples, the IPM index for the QR-BDPCM mode is set to M, M+1 or M+2.

In some examples, the at least one new coding method is included in the set of extended IPMs before one of existing IPMs.

In some examples, the at least one new coding method is included in the set of extended IPMs before all existing IPMs.

In some examples, the IPM index for the palette mode is set to 0.

In some examples, the IPM index for the IBC mode is set to 0.

In some examples, the IPM index for the QR-BDPCM mode is set to 0.

In some examples, the indices of remaining IPMs with original index no smaller than $Idx_{New}$ is revised by being increased by 1.

In some examples, $Idx_{New}$ is pre-defined, or signaled or dependent on at least one of the following:
1) block dimension of current video block,
2) Current quantization parameter of current video block,
3) Indication of the color format including 4:2:0, 4:4:4,
4) Separate/dual coding tree structure,
5) Slice/tile group type and/or picture type,
6) indications signaled in at least one of Sequence Parameter Set (SPS), Picture Parameter Set (PPS), picture header, slice header, tile header.

In some examples, whether and/or how to include a new coding method to the set of existing IPMs depends on block dimension and/or decoded information of the current video block.

In some examples, for M×N blocks, IBC mode is disallowed to be included in the set of extended IPMs, wherein M×N blocks include at least one of 128×128, 128×64 and 64×128 block.

In some examples, for M×N blocks, palette mode is disallowed to be included to the set of extended IPMs, wherein M×N blocks include at least one of 128×128, 128×64 and 64×128 block.

In some examples, for blocks with width larger than K or height larger than L, BDPCM mode is disallowed to be included to the set of extended IPMs, wherein K=32, L=32.

Figure 23:
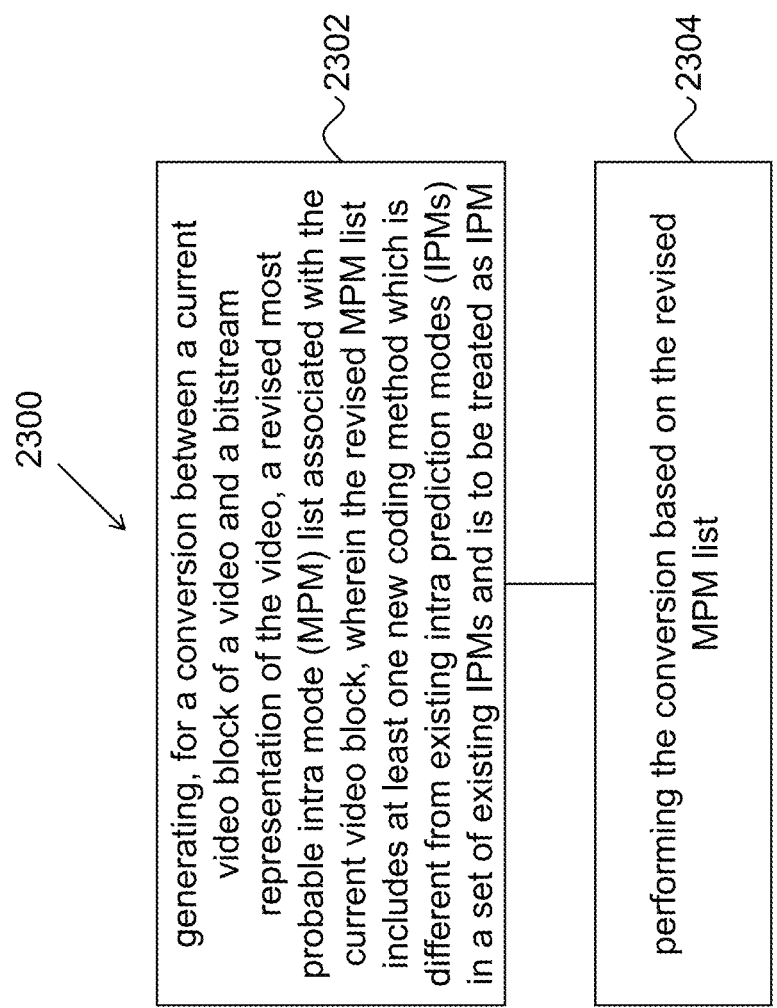
FIG. 23 shows a flowchart of an example method for video processing.

FIG. 23 shows a flowchart of an example method for video processing. The method includes generating(2302), for a conversion between a current video block of a video and a bitstream representation of the video, a revised most probable intra mode (MPM) list associated with the current video block, wherein the revised MPM list includes at least one new coding method which is different from existing intra prediction modes (IPMs) in a set of existing IPMs and is to be treated as IPM; and performing(2304) the conversion based on the revised MPM list.

In some examples, the at least one new coding method include at least one of: a palette mode, an intra block copy (IBC) mode, a quantized residual block differential pulse-code modulation mode (QR-BDPCM), and matrix weighted intra prediction (MIP) mode.

In some examples, generating the revised MPM list comprises: constructing an MPM list of existing intra prediction modes; and replacing a mode in the MPM list with the at least one new coding method to generate the revised MPM list.

In some examples, replacing a mode in the MPM list with the at least one new coding method including: replacing the mode at the first position in the MPM list with the at least one new coding method.

In some examples, replacing a mode in the MPM list with the at least one new coding method includes: replacing the mode at the last position in the list of MPMs with the at least one new coding method.

In some examples, index range of the set of existing IPMs is [0, M−1], and an IPM index for the palette mode is set to M, or an IPM index for the IBC mode is set to M or M+1, or an IPM index for the QR-BDPCM mode is set to M, M+1 or M+2, M being an integer.

In some examples, during the construction of the MPM list, if neighboring blocks of the current video block are coded with the new coding method, the neighboring block is marked as unavailable or treated as inter coded block.

In some examples, generating the revised MPM list comprises: constructing an MPM list of existing intra prediction modes; and adding the at least one new coding method to a given position of the MPM list with so as to generate the revised MPM list, wherein the size of the MPM list is increased by K, K being the number of the new coding modes.

In some examples, the position of the new coding mode depends on at least one of the following:
1) block dimension of the current video block,
2) prediction mode of the current video block,
3) current quantization parameter of the current video block,
4) the palette flag of neighboring blocks,
5) the intra block copy flags of neighboring blocks,
6) indication of the color format including 4:2:0, 4:4:4,
7) separate or dual coding tree structure,
8) slice, tile group type and/or picture type,
9) flags in at least one of SPS, PPS Tile header.

In some examples, generating the revised MPM list comprises: if a neighboring block of the current video block is coded with the at least one new coding method, constructing the revised MPM list with the at least one new coding method being directly added as one of MPMs.

In some examples, generating the revised MPM list comprises: if a neighboring block of the current video block is coded with the at least one new coding method, constructing the revised MPM list with an IPM index corresponding to the at least one new coding method being directly added as one of MPMs.

In some examples, whether and/or how to add a new coding method to the MPM list depend on block dimension and/or decoded information of the current video block.

In some examples, for certain block sizes, IPMs corresponding to the new coding modes are disallowed to be added to the MPM list.

In some examples, for M×N blocks, IPMs corresponding to IBC mode is disallowed to be added to the MPM list.

In some examples, for M×N blocks, IPMs corresponding to Palette mode is disallowed to be added to the MPM list.

In some examples, M×N blocks include at least one of 128×128, 128×64 and 64×128 block.

In some examples, for blocks with width larger than K or height larger than L, IPMs corresponding to BDPCM mode is disallowed to be included to the set of existing IPMs, wherein K=32, L=32.

In some examples, whether and/or how to include a new coding mode in the MPM depends on the enabling flag of the new coding mode in at least one of SPS, PPS, VPS, Tile header and Slice header.

In some examples, filtering process for the current video block depends on the IPMs.

In some examples, the filtering process is associated with at least one of deblocking filter, Sample Adaptive Offset (SAO), Adaptive Loop Filter (ALF), Bilateral filter, Hadamard-domain filter.

In some examples, boundary strength (BS) setting in the deblocking filter depends on the index of IPMs.

In some examples, if the index represents Palette mode, BS is set to 0.

Figure 24:
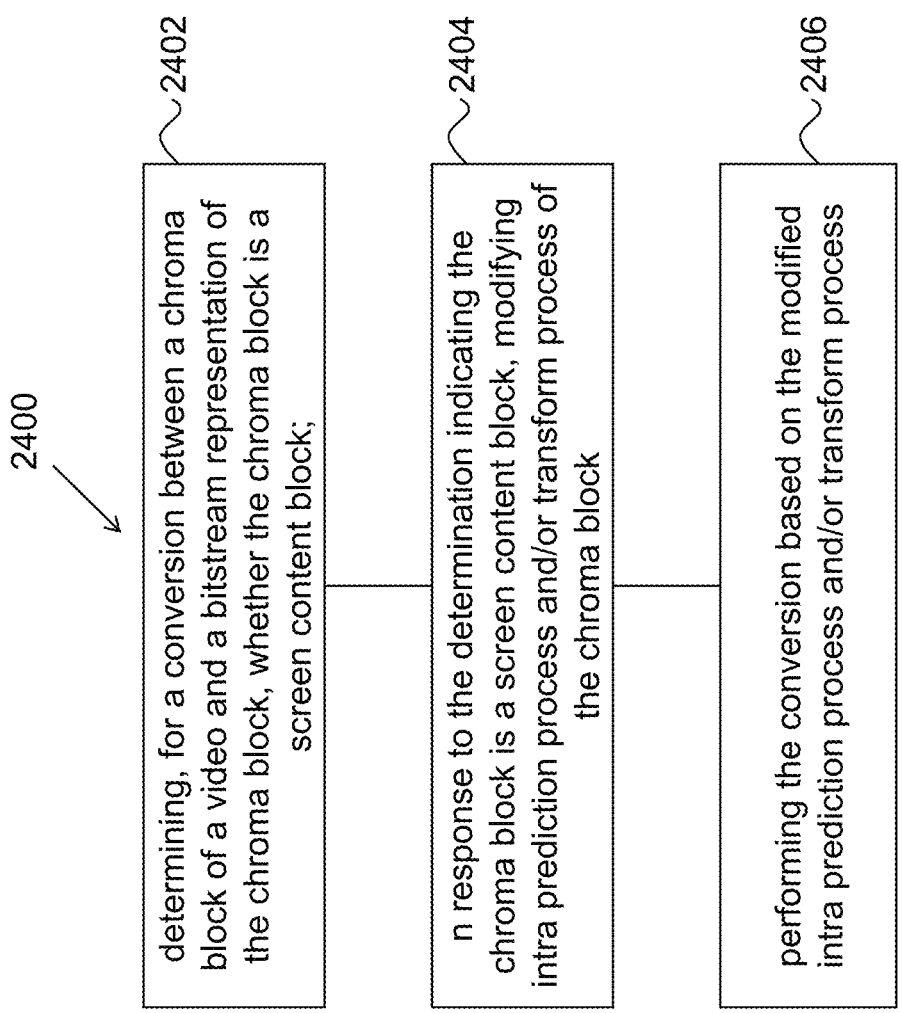
FIG. 24 shows a flowchart of an example method for video processing.

FIG. 24 shows a flowchart of an example method for video processing. The method includes determining(2402), for a conversion between a chroma block of a video and a bitstream representation of the chroma block, whether the chroma block is a screen content block; in response to the determination indicating the chroma block is a screen content block, modifying(2404) intra prediction process and/or transform process of the chroma block; and performing (2406) the conversion based on the modified intra prediction process and/or transform process.

In some examples, when one or multiple selected luma blocks are coded with IBC mode or palette mode, the chroma block is determined as a screen content block.

In some examples, the size of one selected luma block is the smallest CU, PU or TU size or the unit for motion or mode storage.

In some examples, the one selected luma block is the CU, PU or TU covering the center, top left, top right, bottom left or bottom right position of the corresponding luma region.

In some examples, when the top-left coordinate of current chroma block is (x0, y0) and width and height of the current chroma block is w0 and h0, respectively, the coordinate of top-left sample in the corresponding luma region, width and height of the corresponding luma region is scaled according to a color format associated with the current chroma block.

In some examples, for the 4:2:0 color format, the top-left coordinate of the collocated luma region is (2*x0, 2*y0), and the width and height of the collocated luma region are 2*w0 and 2*h0, respectively.

In some examples, for the 4:4:4 color format, the top-left coordinate of the collocated luma region is (x0, y0), its width and height are w0 and h0, respectively.

In some examples, when the top-left coordinate of the collocated luma region is (x, y) and its width and height are W and H, coordinate of the center position is determined as one of the following:

$(x+W/2, y+H/2)$      1)

$(x+W/2-1, y+H/2-1)$      2)

$(x+W/2, y+H/2-1)$      3)

$(x+W/2-1, y+H/2).$      4)

In some examples, when the top-left coordinate of the collocated luma region is (x, y) and its width and height are W and H, coordinate of the top-left position is (x, y).

In some examples, when the top-left coordinate of the collocated luma region is (x, y) and its width and height are W and H, coordinate of the top-right position is one of the following:

$(x+W, y)$      1)

$(x+W-1, y).$      2)

In some examples, when the top-left coordinate of the collocated luma region is (x, y) and its width and height are W and H, coordinate of the bottom-left position is one of the following:

$(x, y+H)$      1)

$(x, y+H-1)$      2)

In some examples, when the top-left coordinate of the collocated luma region is (x, y) and its width and height are W and H, coordinate of the bottom-right position is one of the following:

$(x+W, y+H)$      1)

$(x+W, y+H-1)$      2)

$(x+W-1, y+H)$      3)

$(x+W-1, y+H-1).$      4)

In some examples, when the chroma block is determined as a screen content block, certain intra prediction modes (IPMs) are not allowed.

In some examples, the certain includes DC mode and/or PLANAR modes, VER and/or HOR modes, or derived mode.

In some examples, when the chroma block is determined as a screen content block, position dependent intra prediction combination (PDPC) is not allowed.

In some examples, when the chroma block is determined as a screen content block, mode dependent intra smoothing (MDIS) is not allowed.

Figure 25:
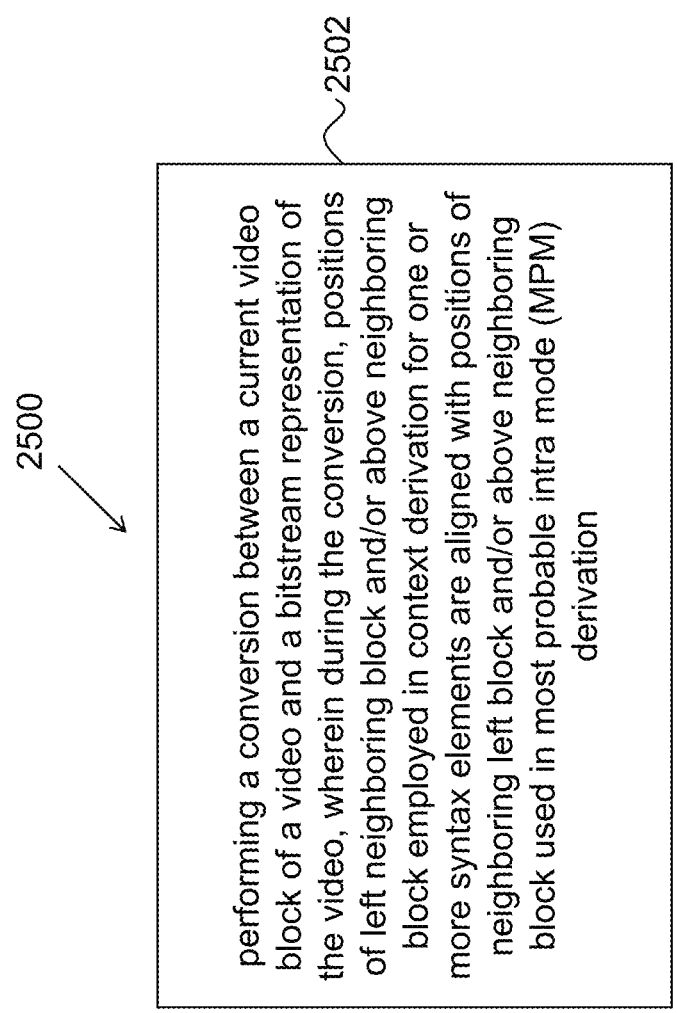
FIG. 25 shows a flowchart of an example method for video processing.

FIG. 25 shows a flowchart of an example method for video processing. The method includes performing (2502) a conversion between a current video block of a video and a bitstream representation of the video, wherein during the conversion, positions of left neighboring block and/or above neighboring block employed in context derivation for one or more syntax elements are aligned with positions of neighboring left block and/or above neighboring block used in most probable intra mode (MPM) derivation.

In some examples, the syntax elements are related to the split flags, the mode constrain flags, the skip flag, the prediction mode flag, the IBC flag and the MIP flag, the affine merge flag and affine inter flag.

In some examples, during the conversion, the positions of left neighboring block and/or above neighboring block employed in the context derivation for one or more syntax elements are aligned with positions of neighboring left block and/or above neighboring block used in the merge or AMVP candidate list derivation process.

In some examples, the positions of neighboring left block and/or neighboring above block employed in the context derivation for the one or more syntax elements are the left-bottom and/or above-right neighboring blocks.

Figure 26:
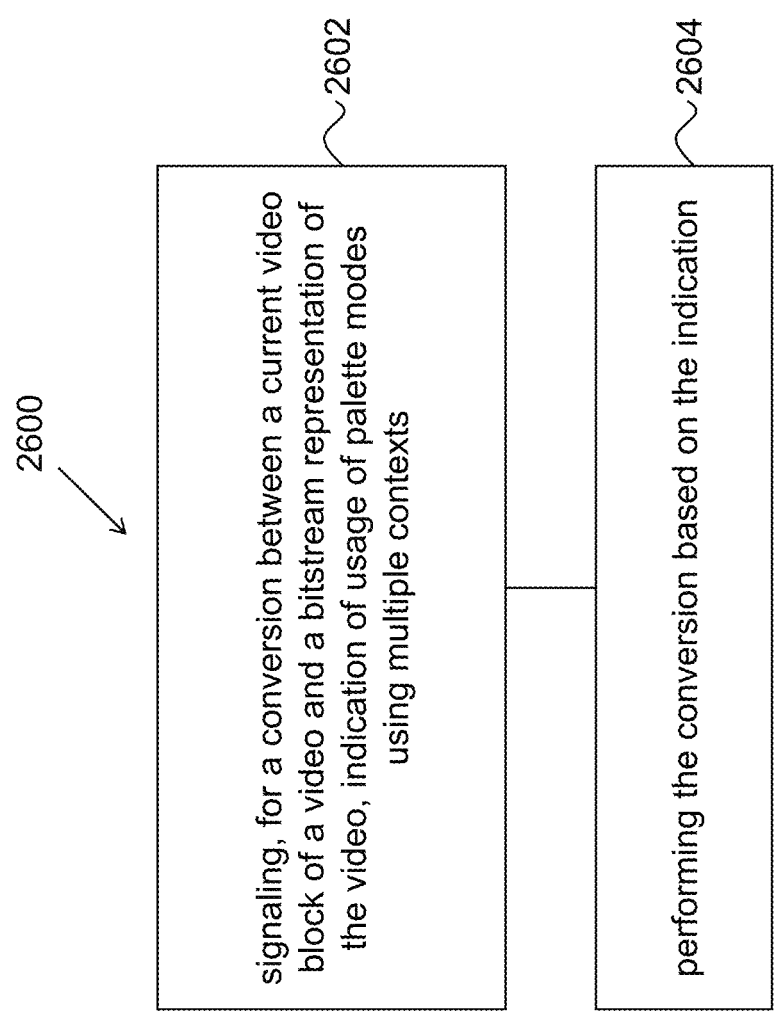
FIG. 26 shows a flowchart of an example method for video processing.

FIG. 26 shows a flowchart of an example method for video processing. The method includes signaling (2602), for a conversion between a current video block of a video and a bitstream representation of the video, indication of usage of palette modes using multiple contexts; and performing (2604) the conversion based on the indication.

In some examples, context derivation for the indication of usage of palette modes is based on the left and/or above neighboring blocks.

In some examples, the context index for the indication of usage of palette modes is derived by A*2+B, where A is the palette flag of the left neighboring block and B is the palette flag of the above neighboring block.

In some examples, the context index for the indication of usage of palette modes is derived by A+B, where A is the palette flag of the left neighboring block and B is the palette flag of the above neighboring block.

In some examples, the positions to derive left and above neighboring blocks used in most probable intra mode (MPM) derivation are used to derive the context for coding the palette mode flag.

In some examples, the positions to derive left and above neighboring blocks used to derive the context for coding the palette mode flag are the positions of the left-above and/or above-left neighboring blocks.

In some examples, wether and/or how apply the above generating processing, determining process, performing processing or signalling processing is based on at least one of the following:
 a. video contents including screen contents or natural contents;
 b. a message signaled in at least one of DPS, SPS, VPS, PPS, APS, picture header, slice header, tile group header, Largest coding unit (LCU), Coding unit (CU), LCU row, group of LCUs, TU, PU block and Video coding unit;
 c. position of at least one of CU, PU, TU, block, Video coding unit;
 d. block dimension of the current video block and/or its neighboring blocks;
 e. block shape of the current video block and/or its neighboring blocks
 f. indication of the color format including 4:2:0, 4:4:4, RGB or YUV;
 g. coding tree structure including dual tree or single tree;
 h. slice, tile group type and/or picture type;
 i. color component including luma component and/or chroma component;
 j. temporal layer ID;
 k. profiles, levels, tiers of a standard.

In some examples, the performing of the conversion includes generating the bitstream representation from the current video block.

In some examples, the performing of the conversion includes generating the current video block from the bitstream representation.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention(s) or of what may be claimed, but rather as descriptions of features that may be specific to particular embodiments of particular invention(s). Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for video processing, comprising:
generating, for a conversion between a current video block of a video and a bitstream of the video, a set of extended intra prediction modes (IPMs) associated with the current video block by revising a set of existing IPMs to include at least one new coding method, wherein the new coding method is different from coding methods in the existing IPMs and is to be treated as IPM; and
performing the conversion based on the set of extended IPMs;
wherein the at least one new coding method includes at least one of: a palette mode, an intra block copy (IBC) mode, and a quantized residual block differential pulse-code modulation mode (QR-BDPCM).

2. The method of claim 1, wherein the set of extended IPMs is signaled with same flag.

3. The method of claim 1, wherein an index range of the set of existing IPMs is [0, M−1], and an index range of the set of extended IPMs is revised to be [0, M−1+K], wherein K is a number of the at least one new coding method to be included in the set of extended IPMs, wherein M and K are integers.

4. The method of claim 3, wherein the at least one new coding method is marked as $Idx_{New}$-th IPM, wherein an IPM index for at least one new coding method $Idx_{New}$ is within the range of [0, M−1+K].

5. The method of claim 4, wherein the at least one new coding method is included in the set of extended IPMs after all existing IPMs.

6. The method of claim 5, wherein the IPM index is set by one of the following:
the IPM index for the palette mode is set to M; the IPM index for the IBC mode is set to M or M+1; and the IPM index for the QR-BDPCM mode is set to M, M+1 or M+2.

7. The method of claim 4, wherein the at least one new coding method is included in the set of extended IPMs before one of existing IPMs.

8. The method of claim 7, wherein the at least one new coding method is included in the set of extended IPMs before all existing IPMs.

9. The method of claim 8, wherein an IPM index for one of the at least one new coding method is set to 0.

10. The method of claim 7, wherein indices of remaining IPMs with original index no smaller than $Idx_{New}$ are revised by being increased by 1.

11. The method of claim 7, wherein $Idx_{New}$ is pre-defined, or signaled or dependent on at least one of the following:
1) a block dimension of the current video block,
2) a current quantization parameter of the current video block,
3) Indication of a color format including 4:2:0, 4:4:4,
4) Separate/dual coding tree structure,
5) Slice/tile group type and/or picture type,
6) indications signaled in at least one of Sequence Parameter Set (SPS), Picture Parameter Set (PPS), picture header, slice header, tile header.

12. The method of claim 1, wherein whether and/or how to include a new coding method to the set of existing IPMs depends on block dimension and/or decoded information of the current video block.

13. The method of claim 12, wherein for M×N blocks, either IBC mode or palette mode is disallowed to be included in the set of extended IPMs, wherein M×N blocks include at least one of 128×128, 128×64 and 64×128 block.

14. The method of claim 12, wherein for blocks with width larger than K or height larger than L, BDPCM mode is disallowed to be included to the set of extended IPMs, wherein K=32, L=32.

15. The method of claim 1, wherein whether and/or how to apply the generating or the performing the conversion is based on at least one of the following:
a. video contents including screen contents or natural contents;
b. a message signaled in at least one of DPS, SPS, VPS, PPS, APS, picture header, slice header, tile group header, Largest coding unit (LCU), Coding unit (CU), LCU row, group of LCUs, TU, PU block and Video coding unit;
c. position of at least one of CU, PU, TU, block, Video coding unit;
d. block dimension of the current video block and/or its neighboring blocks;
e. block shape of the current video block and/or its neighboring blocks
f. indication of a color format including 4:2:0, 4:4:4, RGB or YUV;
g. coding tree structure including dual tree or single tree;
h. slice, tile group type and/or picture type;
i. color component including luma component and/or chroma component;
j. temporal layer ID;
k. profiles, levels, tiers of a standard.

16. The method of claim 1, wherein the conversion includes encoding the current video block into the bitstream.

17. The method of claim 1, wherein the conversion includes decoding the current video block from the bitstream.

18. An apparatus for processing video data comprising a processor and a non-transitory memory with instructions thereon, wherein the instructions upon execution by the processor, cause the processor to:
generate, for a conversion between a current video block of a video and a bitstream of the video, a set of extended intra prediction modes (IPMs) associated with the current video block by revising a set of existing IPMs to include at least one new coding method, wherein the new coding method is different from coding methods in the existing IPMs and is to be treated as IPM; and perform the conversion based on the set of extended IPMs;

wherein the at least one new coding method includes at least one of: a palette mode, an intra block copy (IBC) mode, and a quantized residual block differential pulse-code modulation mode (QR-BDPCM).

19. A non-transitory computer-readable recording medium storing a bitstream of a video which is generated by a method performed by a video processing apparatus, wherein the method comprises:

generating, for a current video block of the video, a set of extended intra prediction modes (IPMs) associated with the current video block by revising a set of existing IPMs to include at least one new coding method, wherein the new coding method is different from coding methods in the existing IPMs and is to be treated as IPM, and generating the bitstream based on the set of extended IPMs;

wherein the at least one new coding method includes at least one of: a palette mode, an intra block copy (IBC) mode, and a quantized residual block differential pulse-code modulation mode (QR-BDPCM).

* * * * *